(12) United States Patent
Sinclair et al.

(10) Patent No.: US 8,782,247 B2
(45) Date of Patent: Jul. 15, 2014

(54) CONNECTION MANAGER AND METHODS OF CONNECTION MANAGEMENT

(75) Inventors: Hunter Sinclair, Cedar Park, TX (US); Adam Klein, Cedar Park, TX (US); James Grantges, Austin, TX (US); John Crane, Austin, TX (US); Yoklim Law, Austin, TX (US); Nicholas Macron, Cedar Park, TX (US); Nishant Jain, Austin, TX (US); David Richard, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1119 days.

(21) Appl. No.: 10/616,515

(22) Filed: Jul. 9, 2003

(65) Prior Publication Data
US 2005/0010693 A1 Jan. 13, 2005

(51) Int. Cl.
*G06F 15/16* (2006.01)
(52) U.S. Cl.
USPC ............................. 709/227; 709/250; 715/733
(58) Field of Classification Search
USPC .................................. 709/227, 250; 715/733
See application file for complete search history.

(56) References Cited

U.S. PATENT DOCUMENTS

| 4,160,124 | A | | 7/1979 | Law |
| 4,447,676 | A | | 5/1984 | Harris et al. |
| 4,873,720 | A | | 10/1989 | Son |
| 5,802,304 | A | | 9/1998 | Stone |
| 6,615,276 | B1 | * | 9/2003 | Mastrianni et al. ........... 709/250 |
| 6,778,651 | B1 | * | 8/2004 | Jost et al. ................. 379/201.01 |
| 6,799,286 | B1 | * | 9/2004 | Evans et al. ..................... 714/57 |
| 2004/0036679 | A1 | * | 2/2004 | Emerson ....................... 345/168 |
| 2004/0148362 | A1 | * | 7/2004 | Friedman ...................... 709/217 |
| 2005/0055371 | A1 | * | 3/2005 | Sunder et al. .............. 707/104.1 |

\* cited by examiner

*Primary Examiner* — John Follansbee
*Assistant Examiner* — Glenford Madamba
(74) *Attorney, Agent, or Firm* — Toler Law Group, PC

(57) ABSTRACT

The disclosure is directed to a connection manager that includes a dialer configured to interact with a modem to provide a connection to a service provider. The connection manager includes a graphical user interface and an advice window. The graphical user interface is configured to manipulate parameters associated with the connection. The graphical user interface includes a form component. The advice window is responsive to user actions associated with the form component.

27 Claims, 28 Drawing Sheets

| NUMBER | PRIORITY |
|---|---|
| 512-555-2727 | 0001 0010 0001 0000 |
| 512-555-3434 | 0001 0010 0011 0000 |
| 512-444-3131 | 0001 0011 0010 0000 |
| 214-333-3333 | 0011 0000 0000 0000 |
| 800-555-5555 | 0111 0010 0000 0000 |

*FIG. 6*

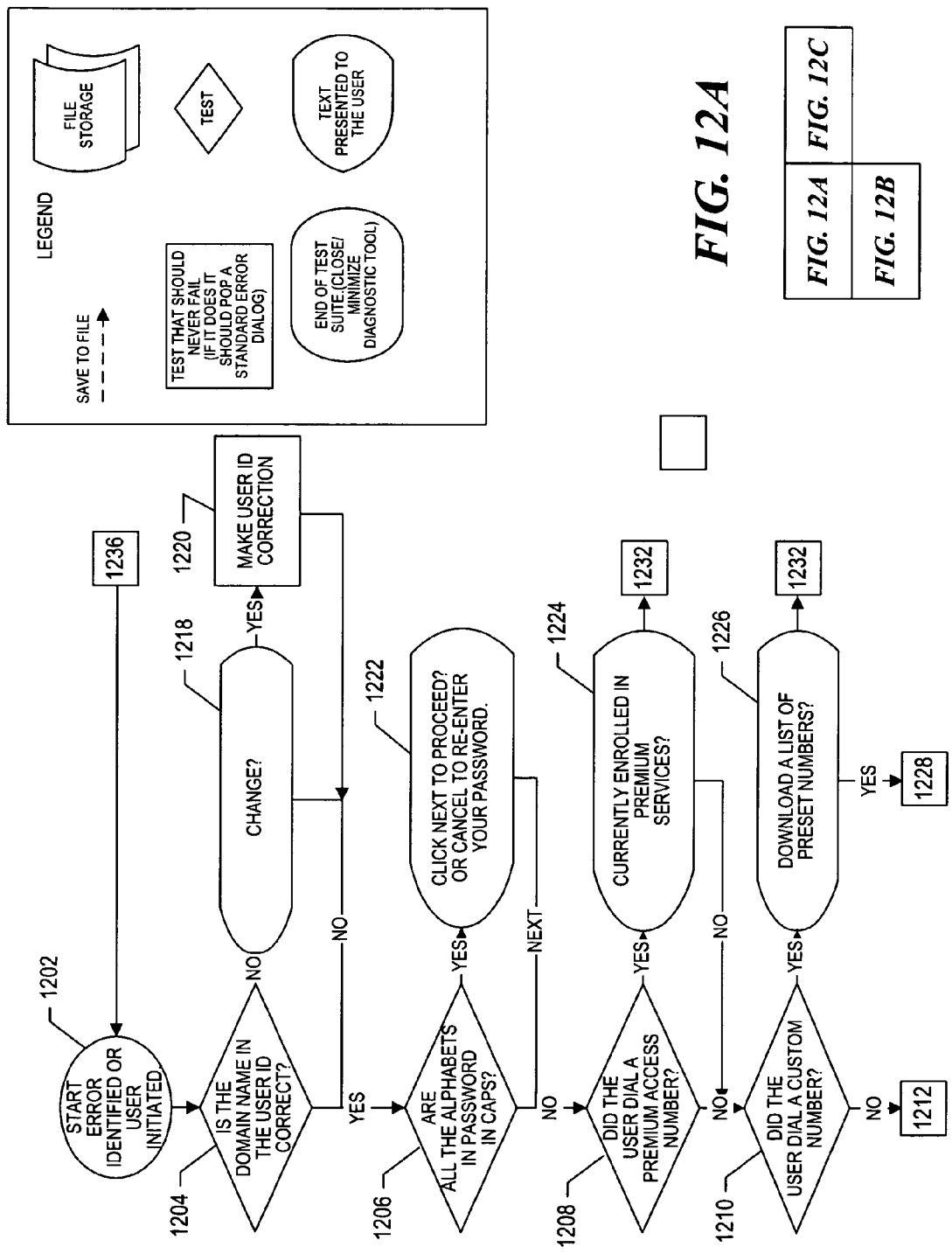

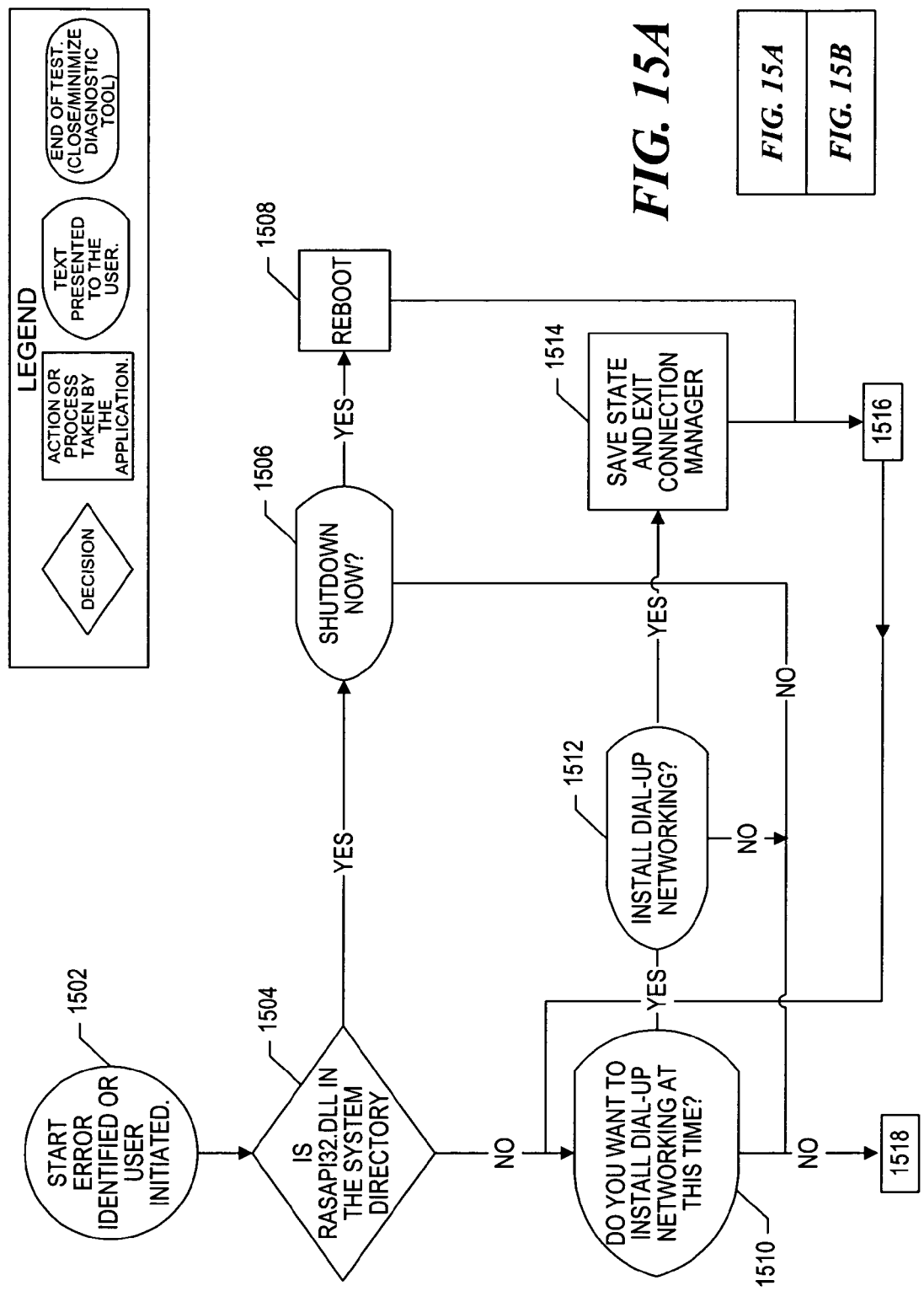

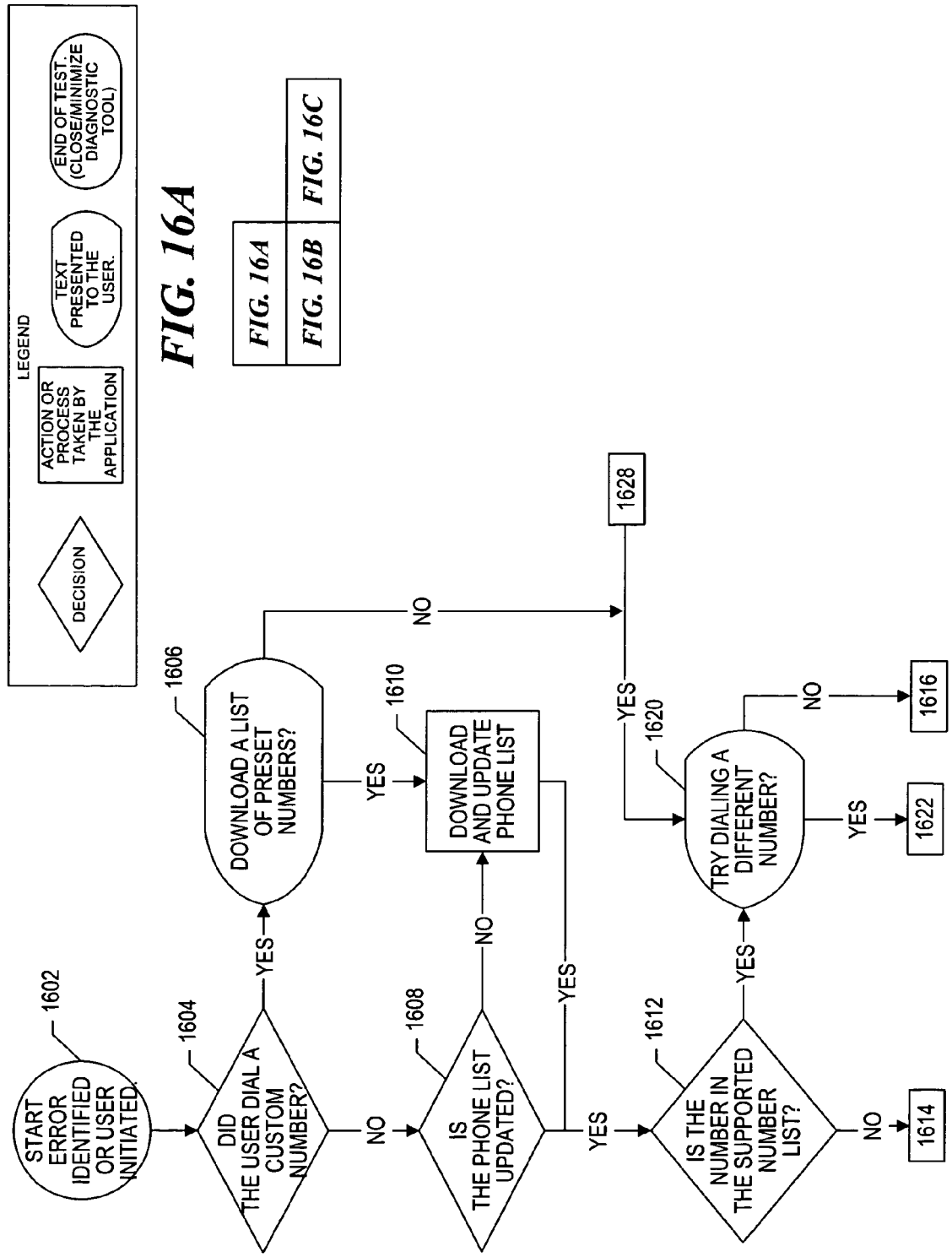

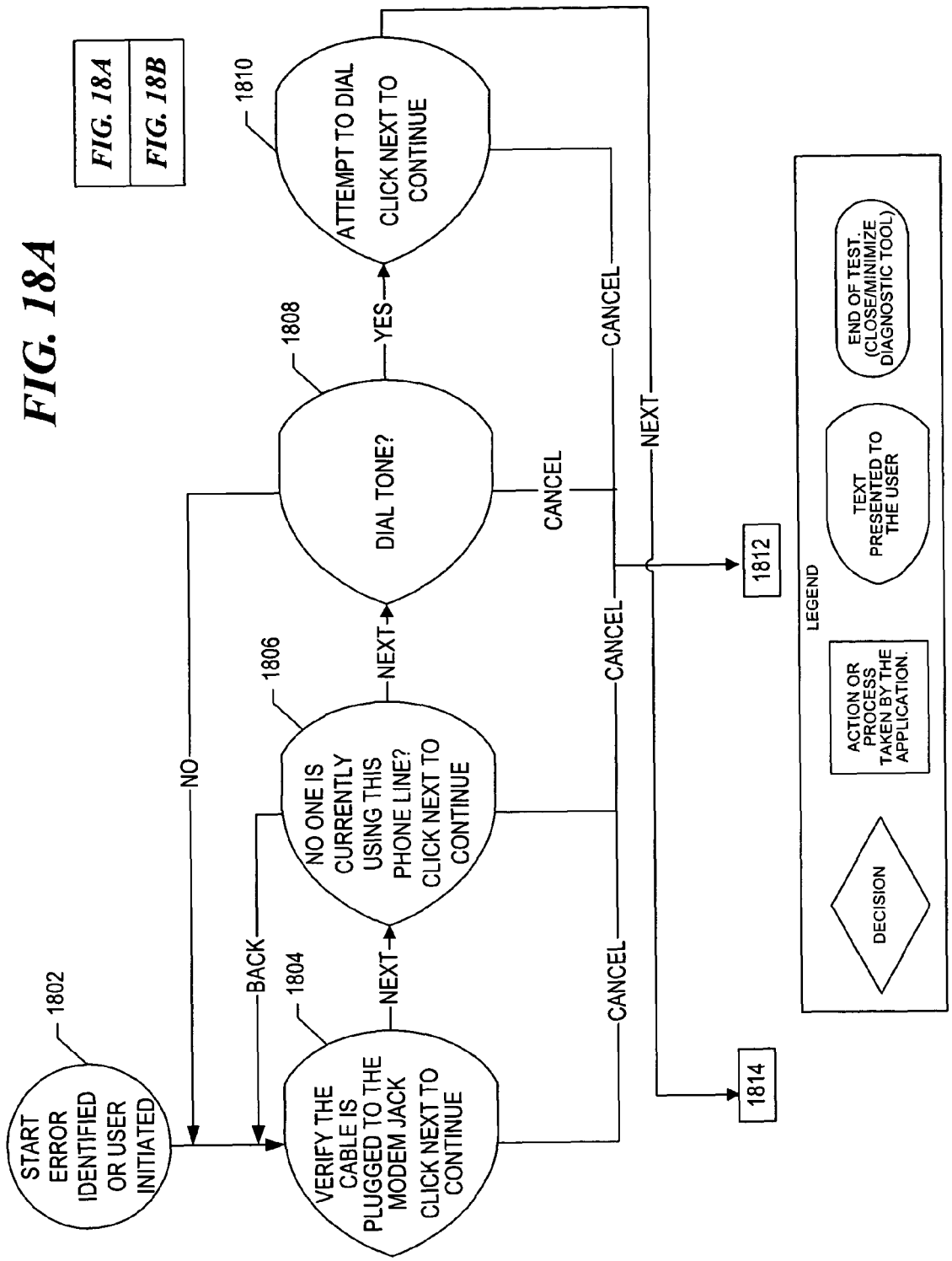

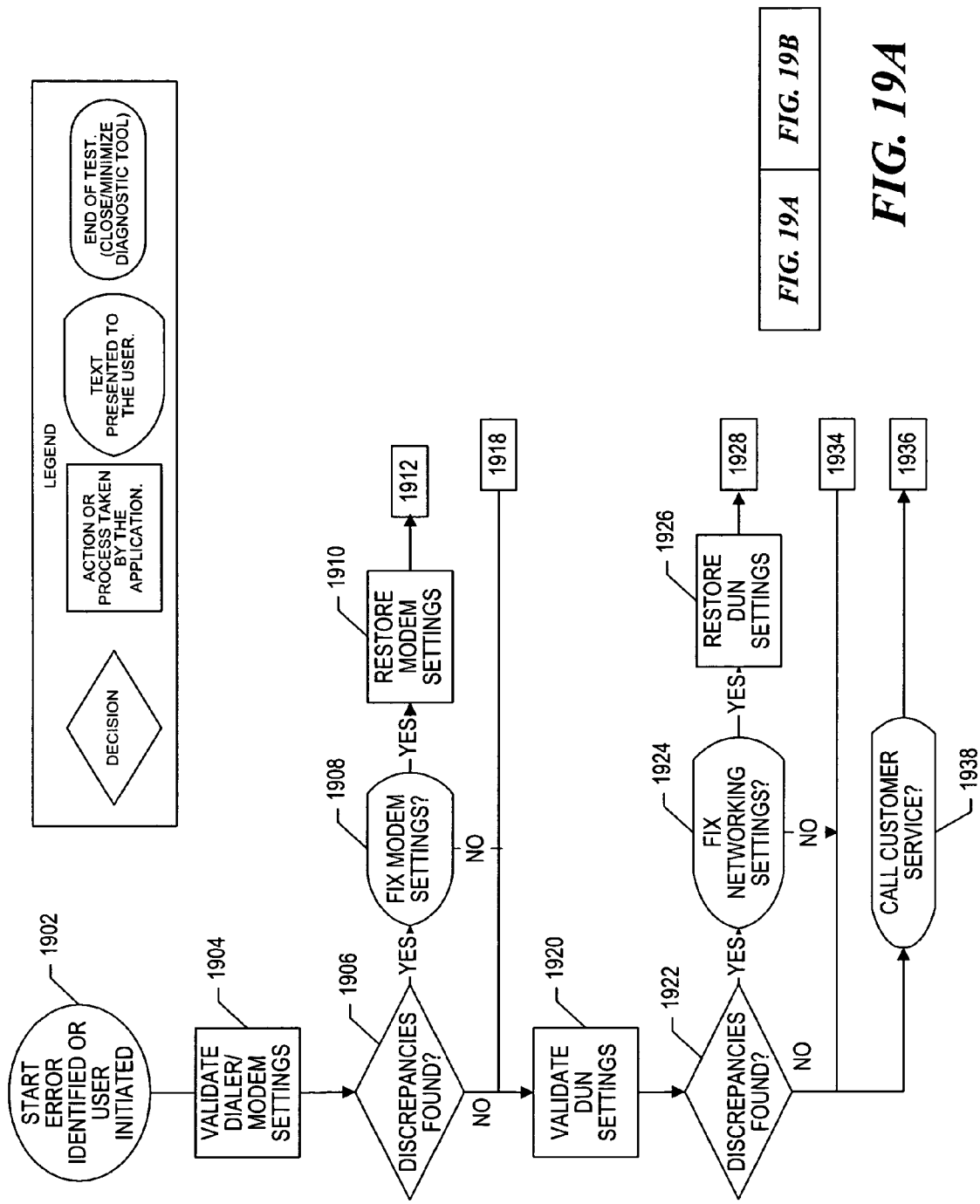

CONNECTION MANAGER AND METHODS OF CONNECTION MANAGEMENT

FIELD OF THE DISCLOSURE

This disclosure, in general, relates to connection managers and methods of connection management.

BACKGROUND

As the Internet and online services become ubiquitous, larger numbers of people subscribe to online access points or Internet service providers. One method for accessing the Internet is the dial-up connection using a modem coupled to a computer. Dial-up connections are often managed by software dialers that direct a modem to dial appropriate phone numbers and establish connections with an Internet service provider. Problems arise in that many different users, having varying computer skill levels, set up and manage the dialing program with varying degrees of effectiveness.

One problem arises in entering login information and access data for use by the dialer. Errors in login IDs, user IDs, passwords, e-mail addresses and other similar data leads to connection errors that both waste system resources and frustrate users.

Another problem arises when system parameters and dialer settings are incorrect, incompatible, or have other errors such that an effective connection is not made. These problems also lead to wasted resources and frustrated users. In addition, such problems result in expensive technical service usage. Providing technical service personnel and systems can be a very large expense for a network or Internet service provider.

A further problem arises in selecting access points. Many Internet service providers offer multiple phone numbers for dial-up access. Ineffective selection of phone numbers often leads to many failed connection attempts due to busy signals caused by excess usage of one phone number and under-utilization of another. In addition, large Internet service providers (ISP) may use third party access points on a contract basis for use during peak usage periods. Over-utilization of these contracted access points and under-utilization of the ISP-owned access points may lead to excessive costs associated with providing Internet service. Therefore, an improved system and method for managing dial-up connections would be desirable.

SUMMARY

This disclosure is directed to a connection manager to manage connecting a computational device to a service provider. The connection manager includes a dialer configured to interact with a modem to provide a connection to the service provider, a graphical user interface, and an advice window. The graphical user interface is configured to manipulate parameters associated with the connection. The graphical user interface includes a form component. The advice window is responsive to user actions associated with the form component.

The disclosure is also directed to a method of improved connection management to connect a computational device to a service provider. The method includes displaying a graphical user interface, displaying an advice window, and accessing a dialer. The graphical user interface includes at least one form component. The advice window is provided in response to a user action associated with the at least one form component. The dialer is configured to direct a modem to connect to the service provider.

The disclosure is further directed to a connection manager to manage connecting a computational device to a service provider. The connection manager includes a dialer, an error-handling component, an error-handling user interface, and an error-handling message proxy. The dialer may interact with a modem to provide a connection to the service provider. The error-handling component is configured to apply the diagnostic logic to an error associated with the dialer. The error-handling user interface is configured to interact with a user. The error-handling message proxy is configured to provide communication between the error-handling user interface and the error-handling component.

In addition, the disclosure is directed to a method to manage connecting a computational device to a service provider. The method includes initiating an error-handling component associated with the dialer, detecting an error associated with the dialer using the error-handling component, directing the error-handling user interface to display a user query, and performing a parameter test using the error-handling component. The dialer is configured to interact with a modem to provide a connection to a service provider. The error is associated with the dialer. The error-handling user interface is directed with the error-handling component. The parameter test is performed using the error-handling component in response to a user response associated with the error-handling user interface.

BRIEF DESCRIPTION OF THE DRAWINGS

FIG. 6 depicts an exemplary list of numbers with associated priorities.

The use of the same reference symbols in different drawings indicates similar or identical items.

DETAILED DESCRIPTION

Figure 1:
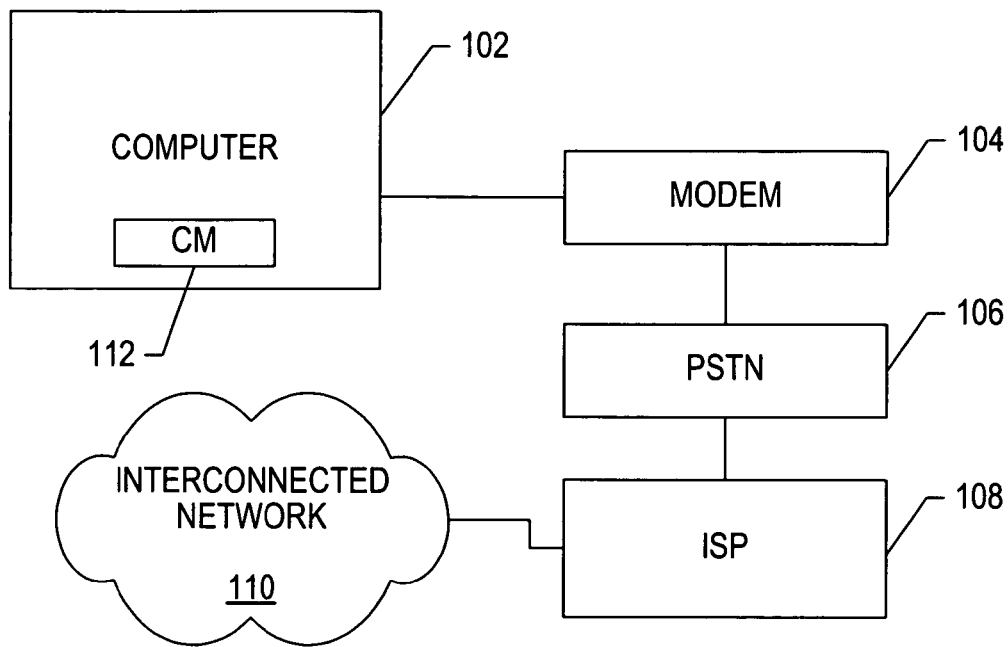
FIG. 1 depicts a connection system.

FIG. 1 illustrates a system for connecting to an interconnected network 110. The system includes a computer 102 coupled to a modem 104. The modem 104 may or may not be housed together or separately with the computer 102. The modem 104 may be communicatively coupled to an Internet service provider 108 or other such network provider via a public switch telephone network 106 or the like. Through this connection, the Internet service provider 108 may provide access to a large interconnected network 110 such as the Internet, a network community, or a bulletin board service. The computer 102 may include a connection manager 112. The connection manager may include a dialer. The dialer may direct the modem 104 to establish a connection with the Internet service provider 108.

Figure 2:
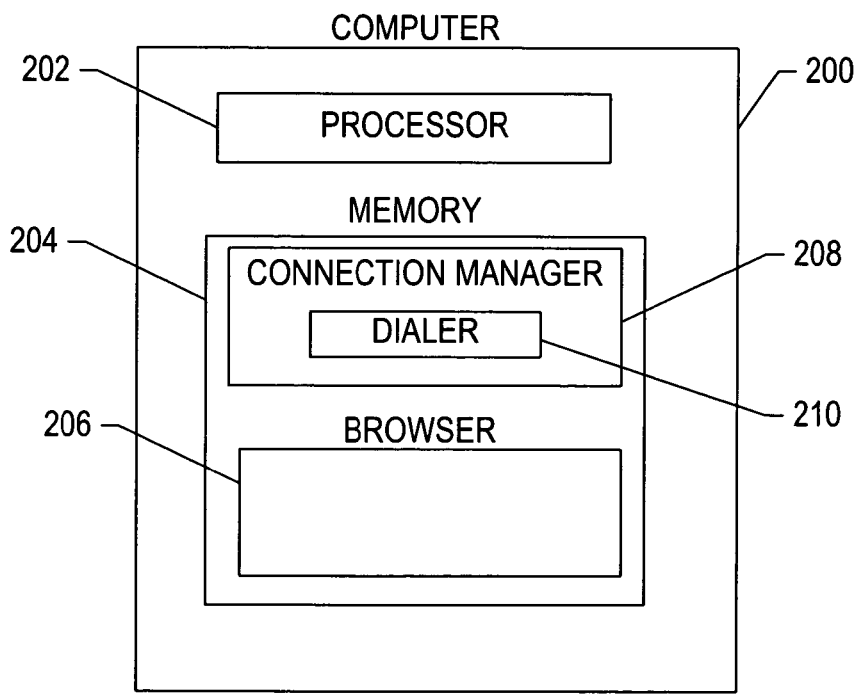
FIG. 2 depicts an exemplary computational device.

FIG. 2 depicts an exemplary computer. The computer 200 may include a processor 202 and a memory 204. Among various programs, the memory 204 may store a connection manager 208 and a browser 206. The browser 206 may, for example, be an Internet browser or a browser associated with an online community. The connection manager 208 may function to manage settings, parameters, phone lists, user identifications, and other data associated with connecting to a network access or Internet service provider. The connection manager 208 may include a dialer 210. The dialer 210 may interface with a modem coupled to or incorporated with the computer 200 to establish connection to a network access or Internet service provider. A user may utilize the connection manager 208 directly or, the connection manager 208 may be activated by the browser 206

Figure 3:
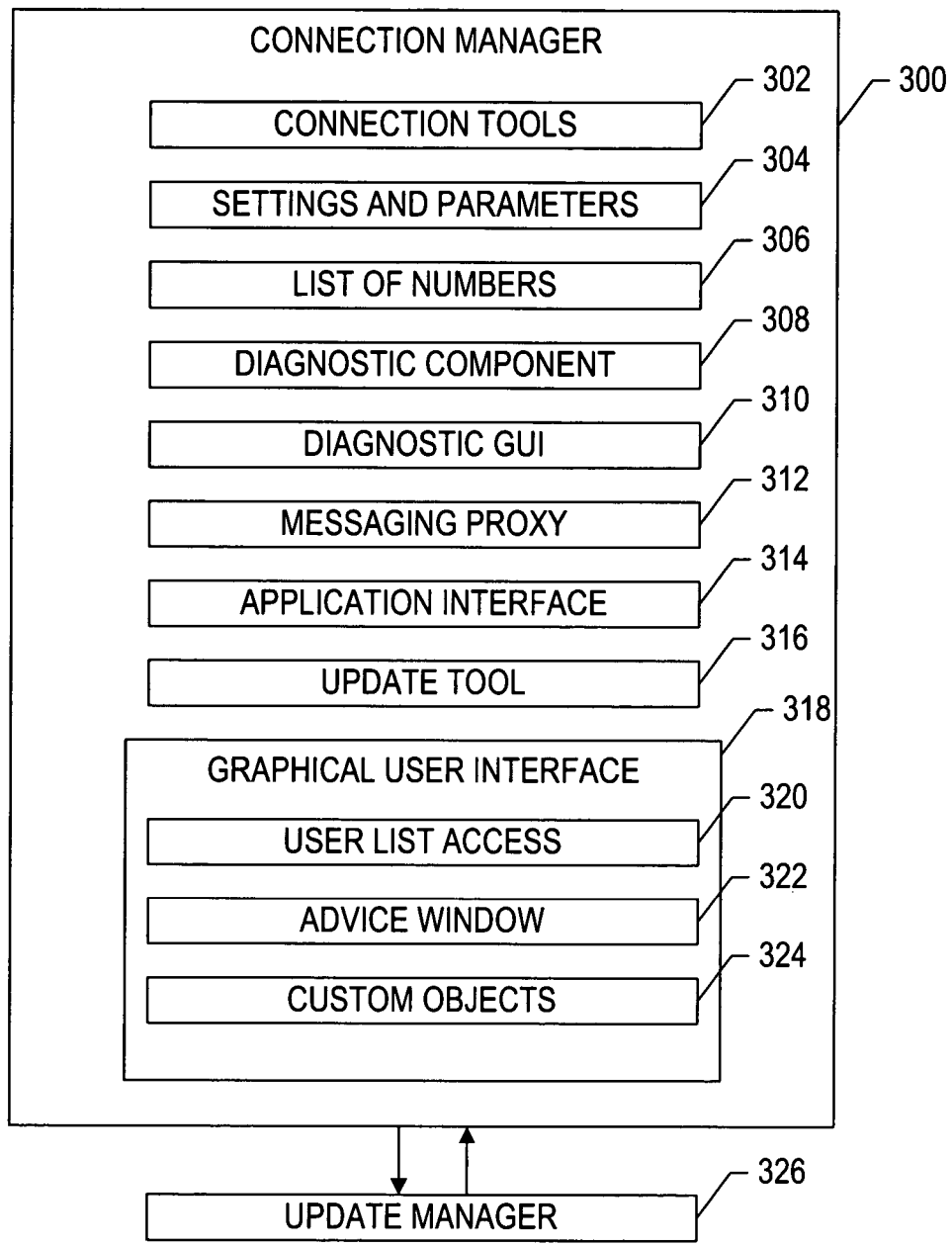
FIG. 3 depicts an exemplary connection manager system.

FIG. 3 depicts a particular embodiment of a connection management system. The connection management system may include a connection manager 300 and an update manager 326. The connection manager 300 may include connection tools 302, settings and parameters 304, lists of phone numbers 306, diagnostic components 308, a diagnostic graphic user interface 310, a messaging proxy 312, an application interface 314, an update tool 316, and a graphic user interface 318. The graphic user interface 318 may include user list access 320, advice windows 322, and custom objects 324. The connection management system may include some or all of these components together, separately, or in various combinations.

The connection tools 302 may include a dialer, and as such may manage and direct a modem to connect to a network access or Internet service provider through a public switch telephone network. The connection tools 302 may be implemented with an RAS network library, which permits access to the connections tools 302 through function calls. These function calls may permit manipulation of dial-up parameters, such as user data or dial-up numbers. The functions may also permit initiating connections, requesting disconnects, or capturing errors. The function calls may also include a dial next function that dials a next number in a list of phone numbers. The function calls may be synchronous or asynchronous.

The connection manager 300 may also include settings and parameters 304. These settings and parameters may be stored in various locations such as XML files, data files, the registry, or INI files. The settings and parameters may include user lists, an update timing parameter, application configuration settings, modem and dial-up settings, and location data. The settings and parameters 304 may be accessed by various components from the connection manager 300 at various points during the operation of the connection manager 300 or the update manager 326.

The connection manager 300 may further include a list of numbers 306. This list of numbers may include phone numbers for accessing network and Internet service providers. The connection manager 300 may also permit the preparation, manipulation, and storage of user-defined sub-lists of phone numbers. Each of the phone numbers in the list of phone numbers 306 may have an associated priority number. The phone numbers may be sorted and ordered in accordance with the priority numbers. The list of phone umbers 306 and their associated priority numbers may be manipulated by the network access or Internet service provider. This manipulation may be propagated to the user-defined sub-lists of numbers. An exemplary embodiment of the list of numbers 306 is shown in FIG. 6.

The connection manager 300 may also include diagnostic component 308, a diagnostic graphic user interface 310, and a messaging proxy 312. The diagnostic component 308 may detect errors occurring in association with the use of connection tools 302. A diagnostic component 308 may then direct the diagnostic graphic user interface 310 via a messaging proxy 312 to display a query to the user. The query may, for example, include a message alerting the user to the error and requesting permission to perform a diagnostics test. When a user response is delivered from the diagnostic graphic user interface 310 through the message proxy 312 to the diagnostic component 308, the diagnostic component 308 may perform a diagnostic test, manipulate parameters, and attempt to remedy errors. Exemplary embodiments of this diagnostic system may be seen in FIGS. 12-19.

The connection manager 300 may also have an application interface 314. The application interface 314 may permit other programs to access data and information associated with the connection manager 300. In addition, the applications interface 314 may permit status checking and connection manipulation by external programs. The application interface 314 may be implemented as a set of COM objects. Various properties and methods may be exposes. Such properties may include a visible property for determining if a window is visible, a connected property indicates whether there is an active connection, a user property that returns a list of members, and an active user property that may be used to acquire or set the active member. The methods may include an exit method, show methods to show or hide various windows, a disconnect method to disconnect a current connection, a connect method to request a connection, an asynchronous connection method to permit connecting while continuing with other functionality, a subscribe to events method to facilitate receiving messages from the connection manager, an unsubscribe to events method, a toll free connect method to dial a toll free number, a disconnect without prompt method, a sign-in method to sign in the current user, a show sign-in method to display a sign-in dialog, an edit connections method to display the edit connections screen, and a refresh connections pane to cause a connection pane to refresh and update itself with the latest information.

An update tool 316 may access an Internet service provider or network access provider to download new phone numbers, update existing phone numbers, and manipulate priority numbers associated with phone numbers. The update tool 316 may, for example, be activated upon the occurrence of set criteria. For example, the update tool 316 may be activated upon the expiration of a time period, or the exceeding of a number of launches. These criteria may, for example, be established by the Internet service provider via the update manager 326 and stored in a registry.

The connection manager 300 may also include a graphic user interface (GUI) 318. The graphic user interface may use various objects including custom objects 324 to facilitate interaction with the user through form components such as text entry components, buttons, check boxes, and pull-down lists, among others. Custom objects 324 may be useful in creating a consistent appearance among user interface objects. In addition, the graphic user interface 318 may include user list access elements 320. The user list access elements 320 may permit manipulation of user data such as login data, passwords, e-mail addresses, user-associated icons, and other user-associated data.

Furthermore, the graphical user interface 318 may include advice windows 322. These advice windows 322 may be displayed upon a user action associated with form objects within the graphic user interface 318, such as custom objects 324. The advice windows 322 may be displayed in response to keyboard states, mouse positions, and analysis of text entered into text entry fields. In one exemplary embodiment, the advice window 322 may be displayed upon determining that the caps lock (i.e. all capital letters) function is on while the user is entering data into the password field. Exemplary embodiments of the advice window functionality 322 may be seen in FIGS. 7, 8, and 9.

The graphical user interface 318 may also include access elements that are impaired access friendly. Elements of the graphical user interface including the advice windows may be readable by screen readers for the seeing impaired, for example.

As shown in FIG. 3, the connection management system may include an update manager 326. The update manager 326 may communicate with the network access or Internet service provider to determine if updates to the connection manager 300 are available. The update manager 326 may also establish time periods or launch counts associated with activation of the update tools 316. The update manager 326 may acquire these settings from the network access or Internet service provider. The update manager 326 may be periodically launched upon the establishment of a connection. For example, the connection manager 300 may establish a connection and wait for a period of time, such as, for example, three minutes. At that point, the update manager 326 may be launched to ascertain whether updates are available or if new timing parameters are to be set. If an update is available, the update manager 326 may download the update and apply the update immediately, upon disconnection, or upon a subsequent start-up event. For example, a new DLL or executable file may be available for part of the connection manager 300. The update manager 326 may download the DLL or replacement code and install it once the connection manager is closed.

Figure 4:
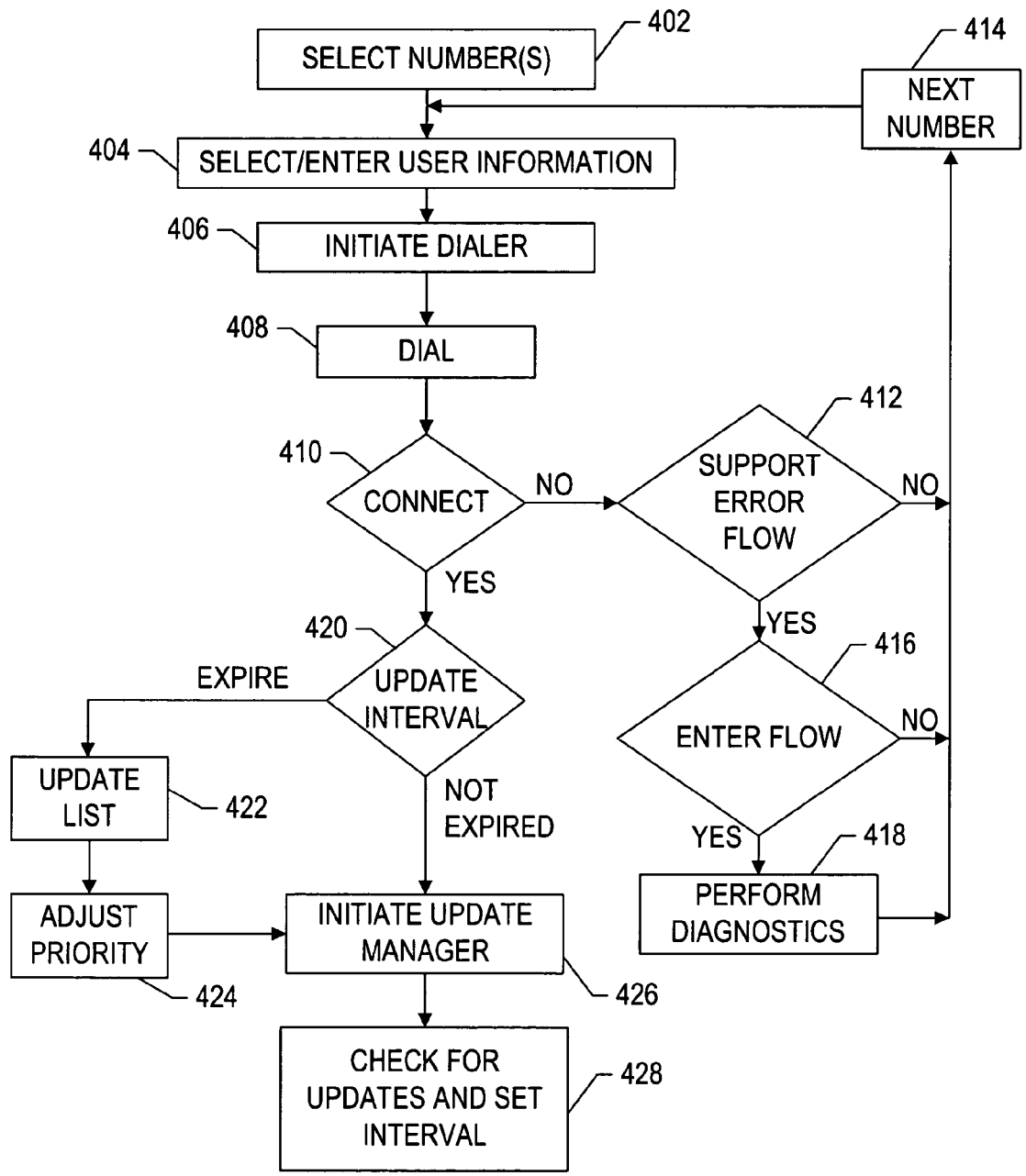
FIGS. 4 and 5 depict illustrative methods that may be used by the connection manager.

FIG. 4 depicts an exemplary method for use in conjunction with the connection manager. As shown in step 402, numbers may be selected for dialing or accessing a network access or Internet service provider. For example, a user may select a single number, a user-defined set of numbers, or a listing of numbers provided by the Internet service provider. The user may then select or enter user information as shown in step 404. The user information may include user ID, password, and other user parameters. Alternately the user may select a user icon from a list of users. The connection manager then initiates the dial-up as shown in step 406 and dials a selected number as shown in step 408. The connection manager determines if a connection is made at step 410. If a connection was not made, a determination is made as to whether an error flow is supported for the error as shown in step 412. This error flow determination may, for example, be made by a diagnostic component. If an error flow is not supported, the system may, for example, select the next number as seen at step 414 and either require the selection of a new user or initiate the dial-up again.

If an error flow is supported at step 412, the user may be prompted to allow entry into the error flow, as shown at step 416. If the user permits this entry, a further set of dialogues and diagnostics may be presented to the user, as shown at step 418. Once the diagnostics are performed, or if the user does not permit entry into the error flow, a next selected number may be dialed as seen at step 414. The next selected number may be the next number in a selected list of numbers or a number subsequently selected by the user.

If a connection is made, the system may determine whether an update interval has been achieved as shown at step 420. This update interval may, for example, be a period of time such as thirty days, a number of connection manager launches such as five launches, or a number of connections or connection attempts. If the update interval is expired, a set of update tools associated with the connection manager may access the network access or Internet service provider to acquire an updated list of phone numbers, as shown in step 422 or an adjusted set of priority numbers, as shown in step 424. Once this update is completed, or if the update interval has not expired, the system may initiate the update manager, as shown in step 426. The initiation of the update manager may also occur at a pre-set interval after a connection is established. The update manager may then check for updates and set the update interval as directed by the Internet service provider, as shown in step 428.

Figure 5:
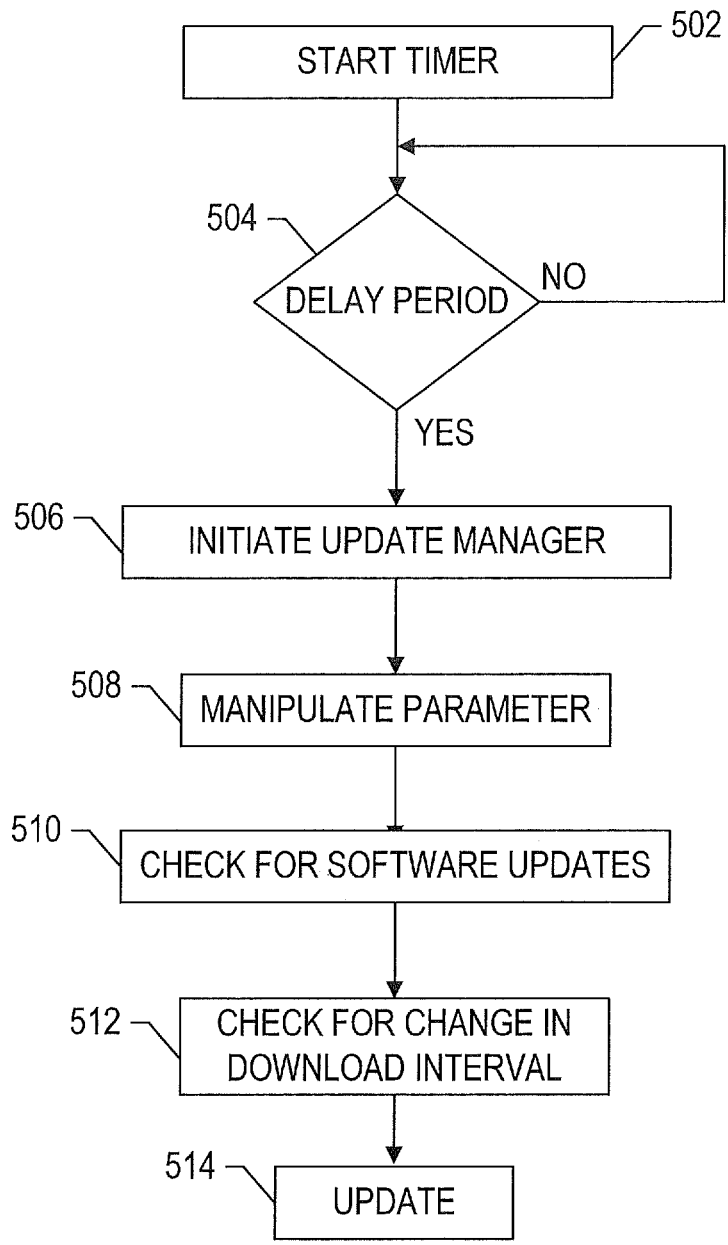

FIG. 5 depicts an alternate embodiment for launching the update manager. As shown at step 502, a timer may be started upon the establishment of a connection with an Internet service provider. Once the delay period has expired as shown at step 504, the update manager may be initiated, as shown at step 506. The update manager may then manipulate the update interval parameter, as shown at step 508. For example, the update manger may manipulate registry settings or other data settings. The update manager may then check for software updates, as shown at step 510 or check for a change in the download interval, as shown at step 512. The update manger may update the connection manager or update interval as shown at step 514. The update may occur immediately upon disconnection from the ISP, or at some other point.

FIG. 6 depicts an exemplary list of phone numbers associated with priority numbers. User defined lists may also be provided that establish a subset of phone numbers to which a dialer may attempt dialing. The numbers in these lists may be sorted and rotated as problems are found with certain numbers. In one exemplary embodiment, the phone numbers are sorted in accordance with a prioritization. FIG. 6 depicts the prioritization of a list of numbers using priority numbers comprising a set of four 4-digit numbers. These 4-digit numbers may, for example, be binary or have some other base. One of the 4-digit numbers may, for example, be the highest priority number and the last number, the lowest priority number. In one exemplary embodiment, the numbers may be concatenated together to provide a large number and the phone numbers sorted in accordance with this large number. In the exemplary embodiments of FIG. 6, the priority numbers are sorted lowest to highest. Alternately, priority numbers may be sorted highest to lowest. In situations where the priority numbers were the same for two phone numbers, the phone numbers may be randomly placed in order. A specific set of priority numbers may also be specified to indicate whether a number should be deleted or ignored.

In the exemplary embodiment shown in FIG. 6, those phone numbers within a specific area code have a higher priority and a lower priority number. Similarly, those phone number having a specific prefix have a higher priority and lower priority number. In other examples, numbers associated with the ISP versus a contractor may be given a higher priority. However, various prioritization schemes may be envisioned.

Each number in the set of four priority numbers may represent a characteristic that provides priority to a given phone number. For example, one of the set of four priority numbers may be a ranking associated with area code. When a connection manager accesses an ISP, the ISP may determine the area code from which the connection manager is accessing the network. The ISP may then set priority codes on phone numbers delivered to the connection manager such that those numbers in the same area code have a higher priority. In another example, a priority number may represent a prefix specific to a local access point. In this manner phone numbers associated with a smaller local area may be given higher priority than phone numbers in other regions associated with an area code. Such prioritization may reduce the resources of the public switch telephone network that are used in making the call. One of the four priority numbers may also be used to specify whether the access number is provided by the ISP or by a contract point-of-presence (POP) provider. Using such an access prioritization, the ISP may reduce costs associated with POP provider contracts.

The connection manager may update the listing of numbers and propagate this update to the user-defined list on a regular basis or as specified. For example a new list of phone numbers for all locations may be downloaded every 30 days by default. Alternately this interval may be changed through an update manager. In a further embodiment, the updates may occur by a number of days since the last download, or by every 'x' number of times the user connects to the network. As new lists are downloaded, each of the user-defined lists and the phone number lists may receive new priority numbers and may be re-prioritized and sorted. Numbers having a priority that indicates deletion or deactivation may be deleted or removed from lists. In addition, the user may be notified if new numbers are provided that have a higher priority than those in the user-defined list.

The dialer may then cycle through these lists. When a connection is first established, the connection manager may dial the first number in the list. If, for some reason, there is a problem with that number, the dialer may cycle to the next number on the list. In the case where these numbers are sorted in accordance with the priority system, the user may be presented with an improved probability of connecting to the ISP. In addition, the ISP may reduce costs associated with contract calls or wasted resource utilization.

Figure 7:
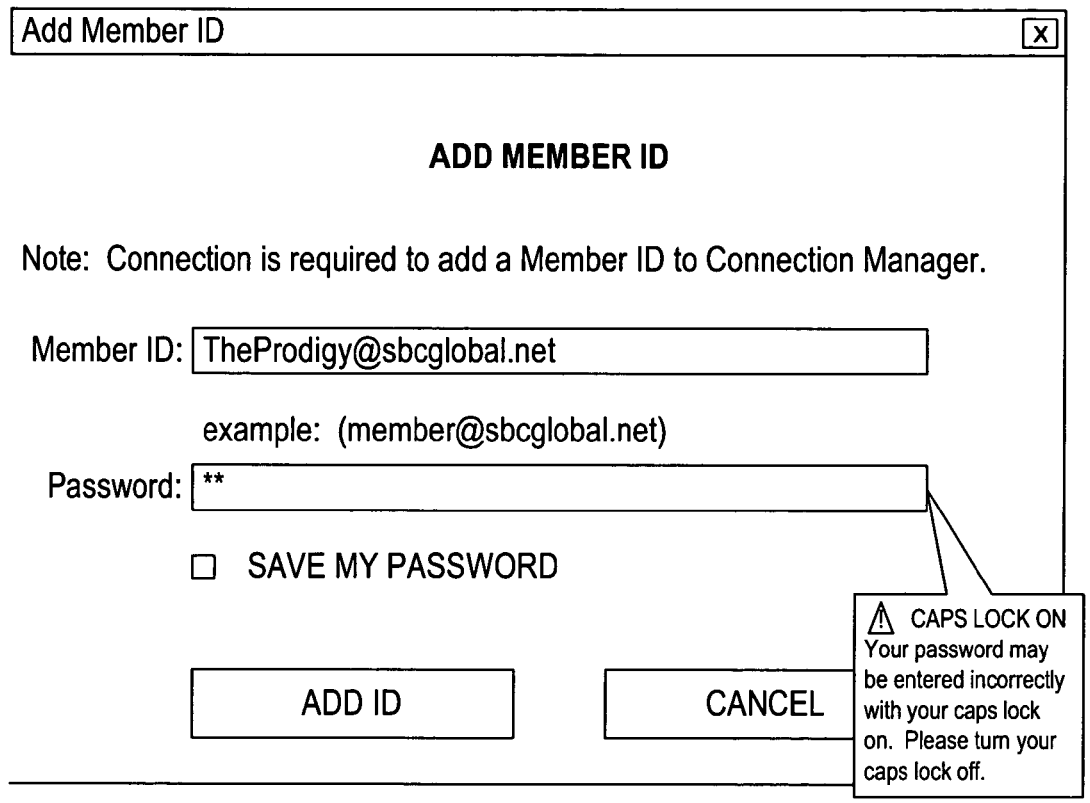
FIGS. 7-8 depict exemplary advice windows
Figure 8:
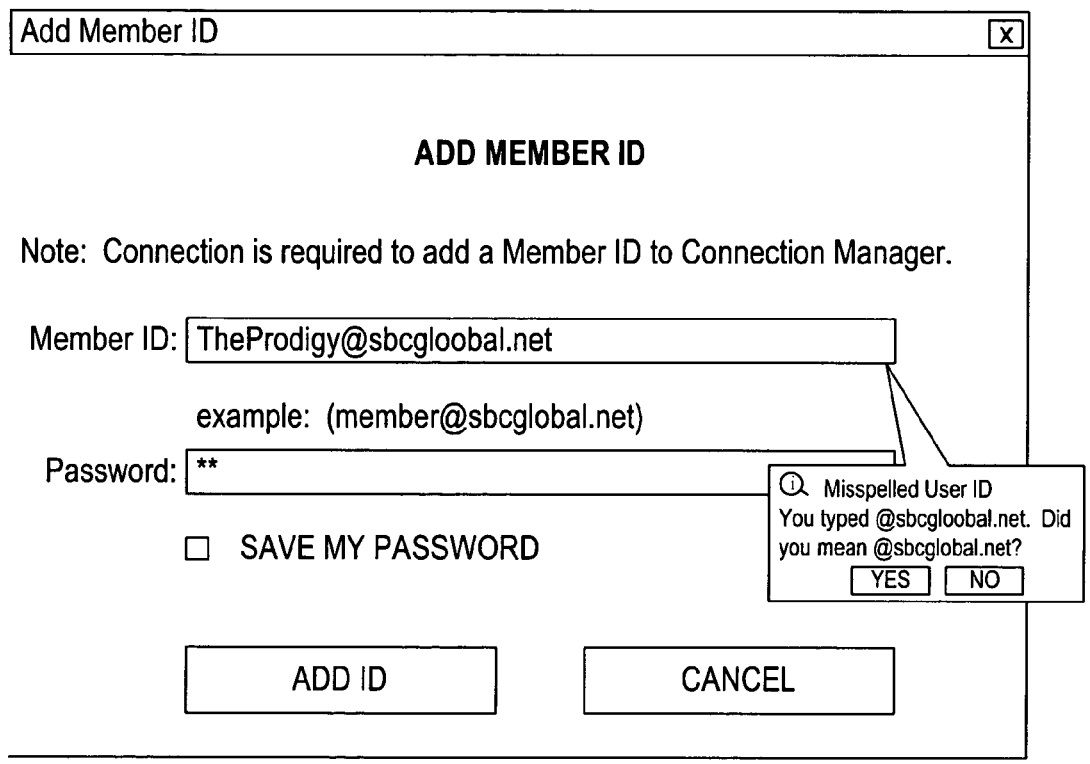

The connection manager may include advice window elements that may be displayed in conjunction with the graphic user interface. FIGS. 7 and 8 depict exemplary embodiments of these advice window elements. In one exemplary embodiment, FIG. 7 depicts an advice window element associated with a password entry box. In this example, a test is performed to determine whether the caps lock keyboard entry is active when a user is entering information into the password entry box. If the caps lock keyboard entry is active, an advice window is displayed warning the user. In this manner, an error may be prevented that would lead to a connection failure. The connection failure would both result in user frustration and wasted usage of the dial-up connection resources associated with the network access or Internet service provider.

In another exemplary embodiment, FIG. 8 depicts an advice window associated with a member or user ID entry box. This device window may be used in conjunction with analysis of the text typed into the entry box. In this exemplary embodiment, the text may be tested for known domain names. This exemplary advice window also depicts the implementation of buttons in the advice window. The advice window may or may not include form objects such as text boxes, check boxes, and buttons, among others. The advice window may also include features such that the advice window minimizes to an icon upon the expiration of a period of time.

The advice windows may be established in a framework consisting of a class or set of classes. The classes may provide for various handling options that dictate the handling behavior of the device windows. These handling options may include closing on any keyboard key press, closing on any mouse-click, closing on timer, minimizing on any mouse-click, closing on timer, minimizing on a timer, closing on a mouse moving out of a tolerant zone, showing the advice window as the top-most window, and having the advice window simulate modal behavior consistent with its parent or associated window.

The advice window may optionally minimize on an associated timer rather than close. The minimize window may consist of an advice icon. When this advice icon is clicked upon, the advice window may maximize to its full size and reset the timer.

The advice window may be dynamically sized and positioned. Based upon the width and height of various internal components, the size may be determined for the base window. This size, for example, may be limited to not exceeding a width of 40% of the current screen width. Depending upon where the advice window is drawn, the advice window may have a tail that appears in different areas and orientations. In one exemplary embodiment, the screen may be divided into four quadrants. Depending upon in which quadrant the tip is drawn, the tail may change so it is positioned toward the screen corner of the quadrant it is currently in, thus insuring the window itself is drawn toward the center of the screen. Although dynamic positioning may be preferred in most scenarios, there may be instances when the dynamic positioning criteria may cause relevant information to be covered and thus confuse the user. For this reason, advice windows may also have functionality to specify in which direction to draw them.

An anchor point may be specified for placement of the balloon or advice window's tail. This point may be used to differentiate to what the advice window refers. The advice window may optionally attach to the desktop, in which case it is stationary, or to an existing window. Once the advice window is anchored to a window it may follow that window, with the anchor point staying in relative alignment with the base window. As the anchor point moves, the rest of the balloon or advice window repositions itself in accordance with the rules above.

If the anchor point at the tip of the tail is in such a position that it would force part of the window off screen, the tail may be stretched and the window itself remain constrained to the screen's viewable area. The advice window may support various icons, text, check boxes, lists, combo boxes, hyperlinks, and buttons. These components may be used to convey appropriate message and emphasis to the user, as well as gathering user input. The components may be implemented using objects and object controls.

In one exemplary embodiment, the advice windows may be turned off in a settings menu. This permits the user to control, to some extent, the appearance of the connection manager.

Figure 9:
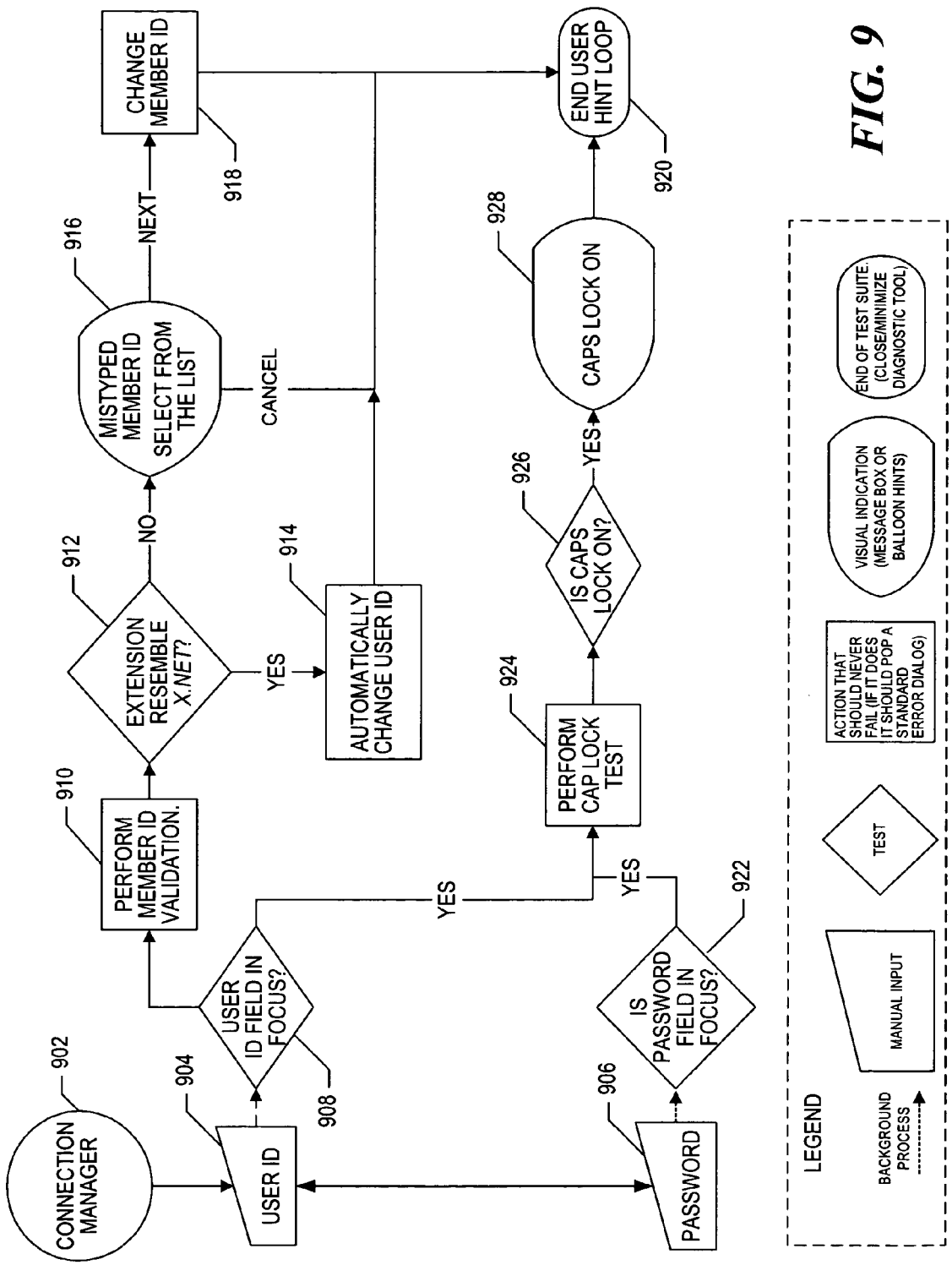
FIG. 9 illustrates an exemplary method for providing an advice window.

FIG. 9 depicts an exemplary method for initiating the display of an advice window. Initiation of the connection manager and various actions within the connection manager may result in the querying of a user to provide a login ID or a password, as shown at step 902. The user may input a user ID, as shown at step 904. Diagnostic tools or the connections manager may determine if the user ID field is in focus, as shown at step 908. If the user ID field is in focus, the system may perform a caps lock test, as shown at step 924. If the caps lock is on, as shown at step 926, the system may display a user advice window indicating that the caps lock is on, as shown at step 928. Similarly, if the password box is in focus, the caps lock test may be performed.

In the case of the user ID box, another test may be performed to determine if the member ID is validated, as shown at step 910. If the extension does not match known domain extensions, as shown at step 912, the user may be presented with an advice window encouraging the correction of the member ID. In some exemplary embodiments this may include suggesting an alternative, offering to change the member ID to a known alternative, and providing a list of alternatives. If the user permits changing the alternative, the system may automatically use the member ID, as shown at step 918. In an alternate case, the system may automatically change the member ID to reflect known domain extensions to the member ID if the domain extension is close enough to the known domain extensions, as shown at step 914.

Figure 10:
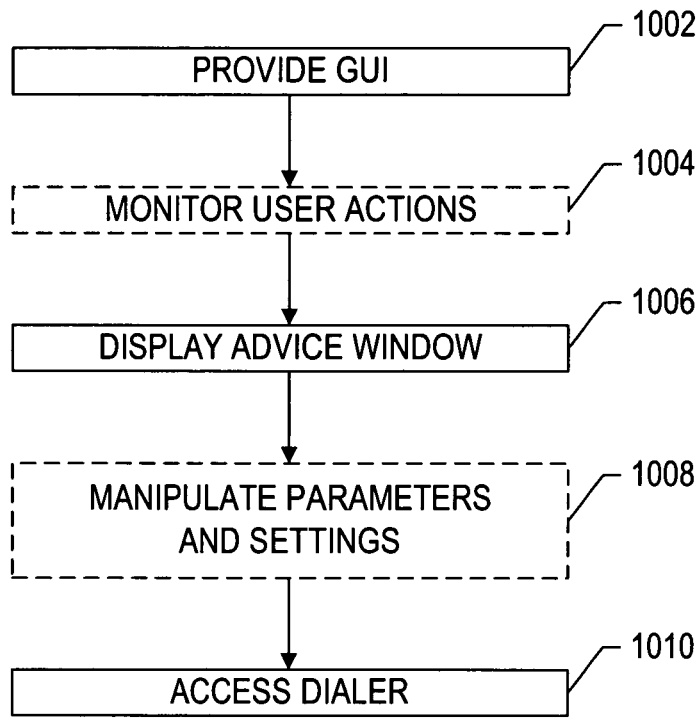
FIG. 10 illustrates another exemplary method for providing an advice window.

FIG. 10 depicts an exemplary method for displaying an advice window. The connection manager may provide a graphic user interface, as shown in step 1002. A diagnostics tool or the connection manager may monitor user actions, as shown at step 1004. Alternately, these user actions may be determined through function calls to the system. If some error expectation criterion is met, an advice window is displayed, as shown at step 1006. The advice window may or may not query a user to permit parameter manipulation and settings manipulation. If the user permits manipulation of parameters and settings, these may be manipulated, as shown at step 1008. After this error checking and entry of data, the dialer may be accessed, as shown at step 1010.

Figure 11:
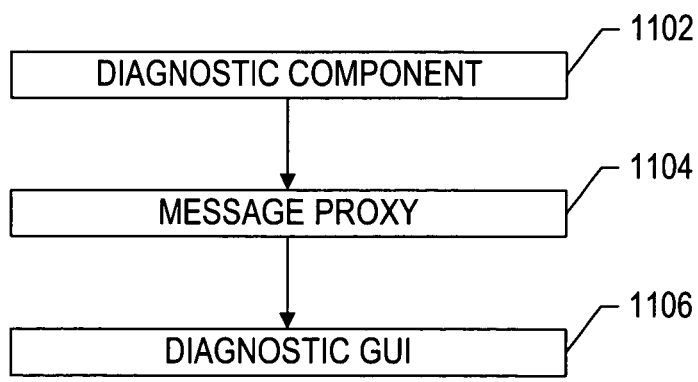
FIG. 11 depicts an exemplary diagnostics system.

FIG. 11 depicts an exemplary embodiment of a diagnostic system incorporated into the connection manager. This diagnostic system may be used in conjunction with the advice windows and may at some extent direct the display and appearance of the advice windows. The diagnostic system includes a diagnostic component 1102 with a diagnostic graphic user interface 1106. The diagnostic component 1102 communicates with the diagnostic graphic user interface 1106 through a message proxy 1104. In some cases this diagnostics communication may be synchronous and in others it may be asynchronous. In one exemplary embodiment, the diagnostic graphic user interface 1106 lacks logical programming. The diagnostic component 1102 contains the logical programming and directs the diagnostic graphic user interface 1106 through the message proxy 1104 to display queries and acquire responses from a user. To create message integrity, the diagnostic component 1102 may initiate the message proxy 1104. While many of the signals sent from the diagnostic component 1102 to the diagnostic graphic user interface 1106 may request a response from a user, the signal may also be a one-way communication from the diagnostic component 1102. When a signal is sent from the diagnostic component 1102 to the diagnostic graphic user interface 1106 to display a particular problem solver page, if a response is requested, the message proxy 1104 may wait endlessly until the diagnostic graphic user interface 1106 passes a message to be delivered to the diagnostic component 1102. If a response is not requested, the message proxy 1104 may return immediately. The diagnostic component 1102 may communicate with various components of the connection manager such as connection tools and dialers to capture errors. The diagnostic component 1102 may then initiate a display through the diagnostic graphic user interface 1106 to alert the user and acquire responses. Through these responses, the diagnostic component 1102 may obtain permission to run diagnostics tests, change or manipulate parameters, or, in general, solve problems associated with the connection manager. The diagnostic graphic user interface 1106 may also conform with general accessibility guidelines for access with disabled individuals.

The diagnostic component 1102 may capture various errors and apply a logic flow to identify and solve certain problems. FIGS. 12-19 are exemplary embodiments of potential error correction methods to exemplary problems.

Figure 12B:
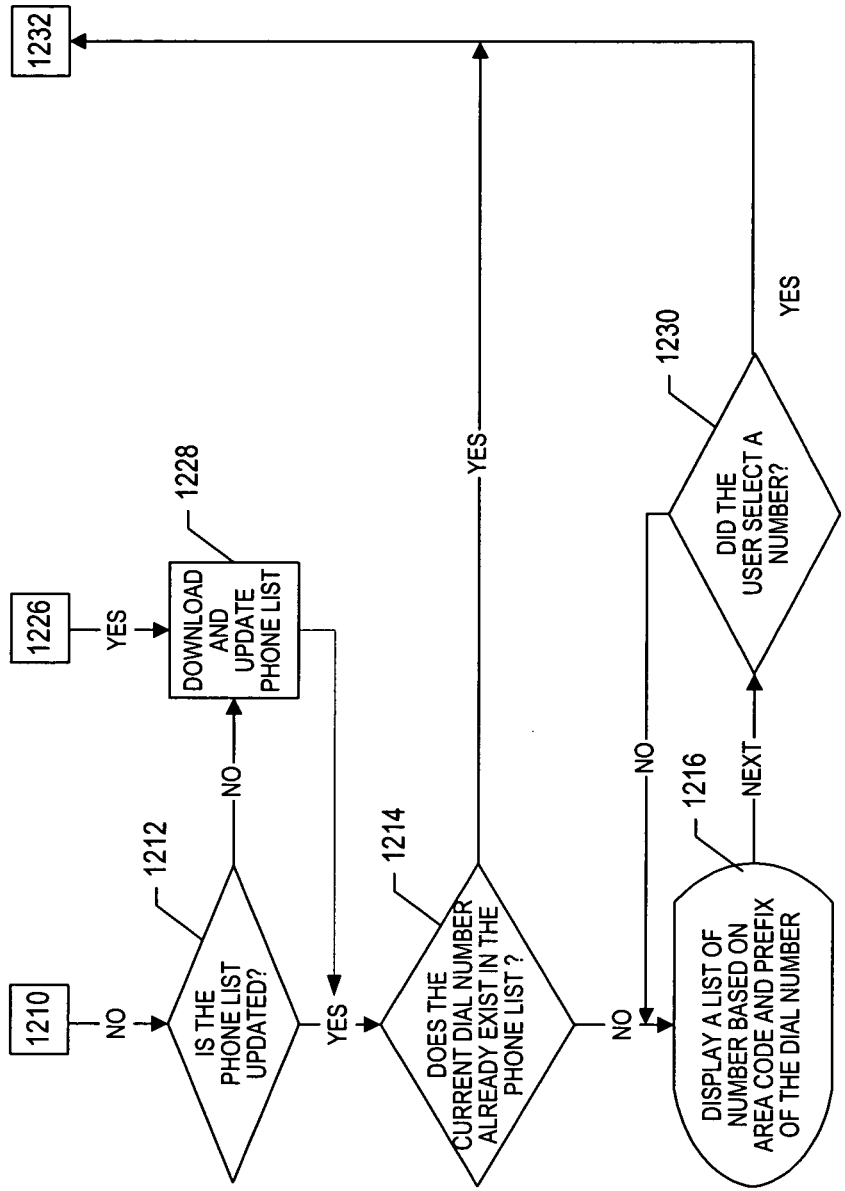
FIGS. 12-19 depict an exemplary method for use in diagnostic testing.
Figure 12C:
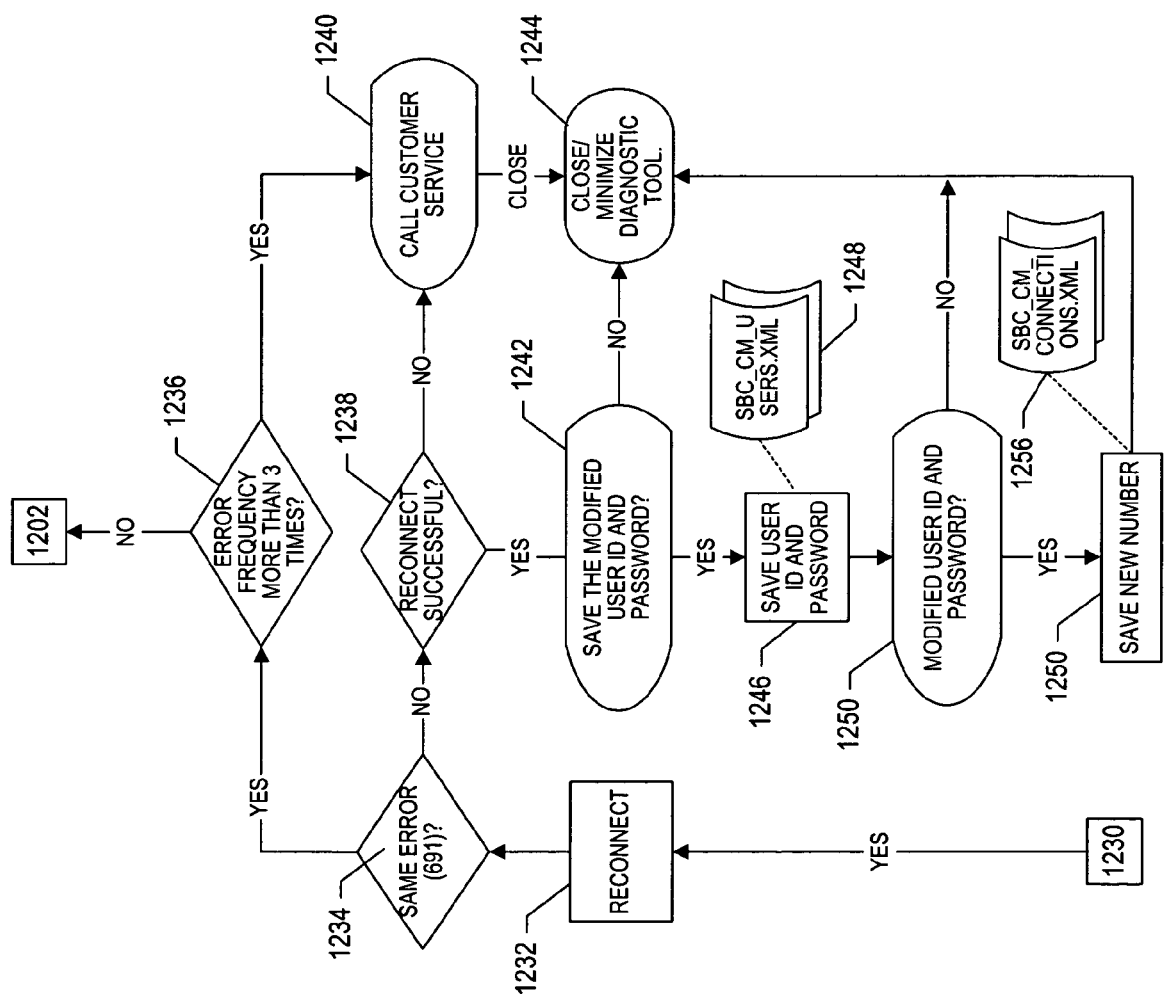

FIGS. 12A, 12B, and 12C depict an exemplary failure flow for an authentication error. At step 1202 an error is identified. At a step 1204, the diagnostic component may determine whether the domain name in the user ID is correct. If the domain name is not correct, the diagnostic graphic user interface (GUI) may be directed to display an error message and request permission to make the corrections. If permission is provided, the diagnostic component may make the user ID corrections, as shown in step 1220. The diagnostic component may also check to determine whether the letters in the password are in all caps as shown step 1206. If the letters are all caps, the diagnostic GUI may provide a message to the user indicating that the letters are in all caps and request a re-entered password as shown at step 1222. The diagnostic component may then determine whether the user dialed a premium access number, as shown in step 1208. The diagnostic user interface may be directed to present a query to the user to determine whether the user is enrolled in a premium dial-up service, as shown in 1224. If the user is enrolled, the system may be directed to reconnect, as shown in a step 1232. If the user is not enrolled, the system may determine whether the user dialed a custom number as shown in step 1210. If the user dialed the custom number, the graphic user interface will request permission to download a list of numbers, as shown in step 1226. If permission is not provided, the system may attempt to reconnect, as shown in step 1232. If permission is provided, the system may download and update a phone list, as shown in step 1228.

The diagnostic component may also attempt to determine whether the phone list has been updated, as shown in step 1212. If not, it may download and update a phone list, as shown in step 1228. The diagnostic component may further attempt to determine whether the current dialed number exists in the phone list, as shown in step 1214. If not, the diagnostic component may direct the diagnostic GUI to display a list of numbers based on the area code and prefix of the dialed number, as shown in step 1216. The system may then determine whether the user selected a number, as shown in step 1230 and, if so, reconnect, as shown in step 1232.

The system may then attempt to determine whether the same error has persisted, as shown in step 1234. If the same error persists, the system may check to see if the error has occurred more than three times, for example, as shown in step 1236. If not, the system may go through the process again. If the error has occurred several times, the system may provide a communication to the user indicating that the dial doctor was unable to solve the problem and suggesting calling customer service, as shown in step 1240. If the same error does not occur, the system tests to determine whether the reconnect was successful, as shown in step 1238. If the reconnect was unsuccessful, the system may display an error message to the user and suggest calling customer service, as shown in step 1240. If the reconnect is successful, the graphic user interface may request permission to save the modified password and user ID, as shown in step 1242. If permission is not provided, the system may close and minimize the diagnostic graphic user interface. If permission is provided, the system may save the user ID and password, as shown in step 1246. In one exemplary embodiment the user password may be saved in an XML fie, as shown in file 1248. The system may also request permission to save the new phone number. If permission is granted, the phone number may also be saved in to an XML file, as shown in step 1252 and XML file 1256.

Figure 13:
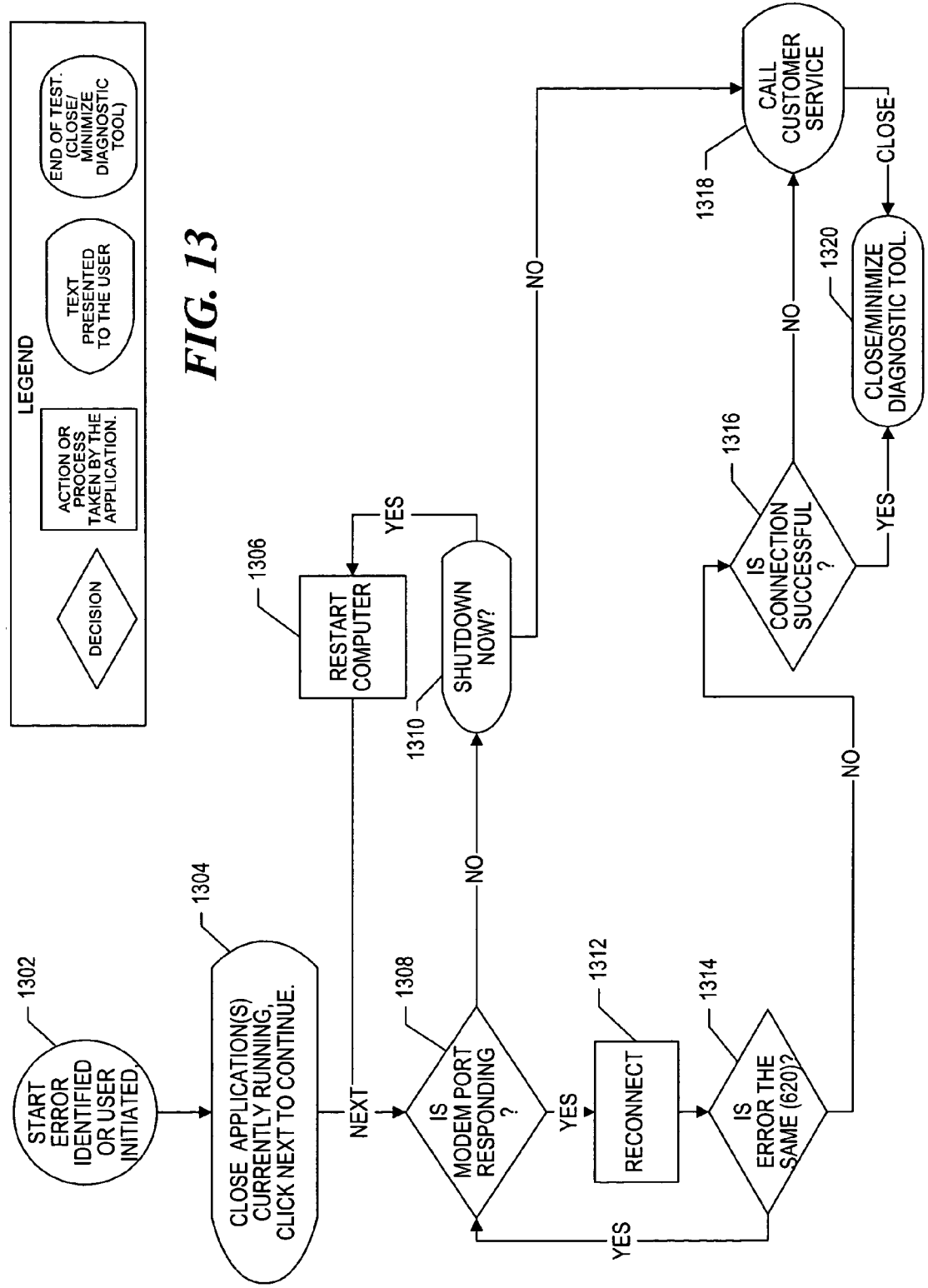

FIG. 13 depicts an error flow for a modem port unavailable error. As shown in step 1302, the error may be detected. The diagnostic GUI may alert the user and suggest closing other applications, as shown in step 1304. The system may then determine if the modem port is responding, as shown in step 1308. If the modem port is not responding, the system may recommend a shut-down and ask permission to do so, as shown in step 1310. If permission is provided, the system may restart the computer, as shown in step 1306, and retest the modem port, as shown in step 1308. If the modem port is responding, the system may attempt to reconnect, as shown in step 1312. If the same error occurs, as shown in step 1314, the system may retest the modem port. If the error does not occur, the system may determine if the connection was successful, as shown in step 1316. If the connection was unsuccessful, the error message may be displayed suggesting contacting customer service, as shown in step 1318. If the connection is successful, the diagnostic GUI may be closed or minimized, as shown in step 1320.

Figure 14A:
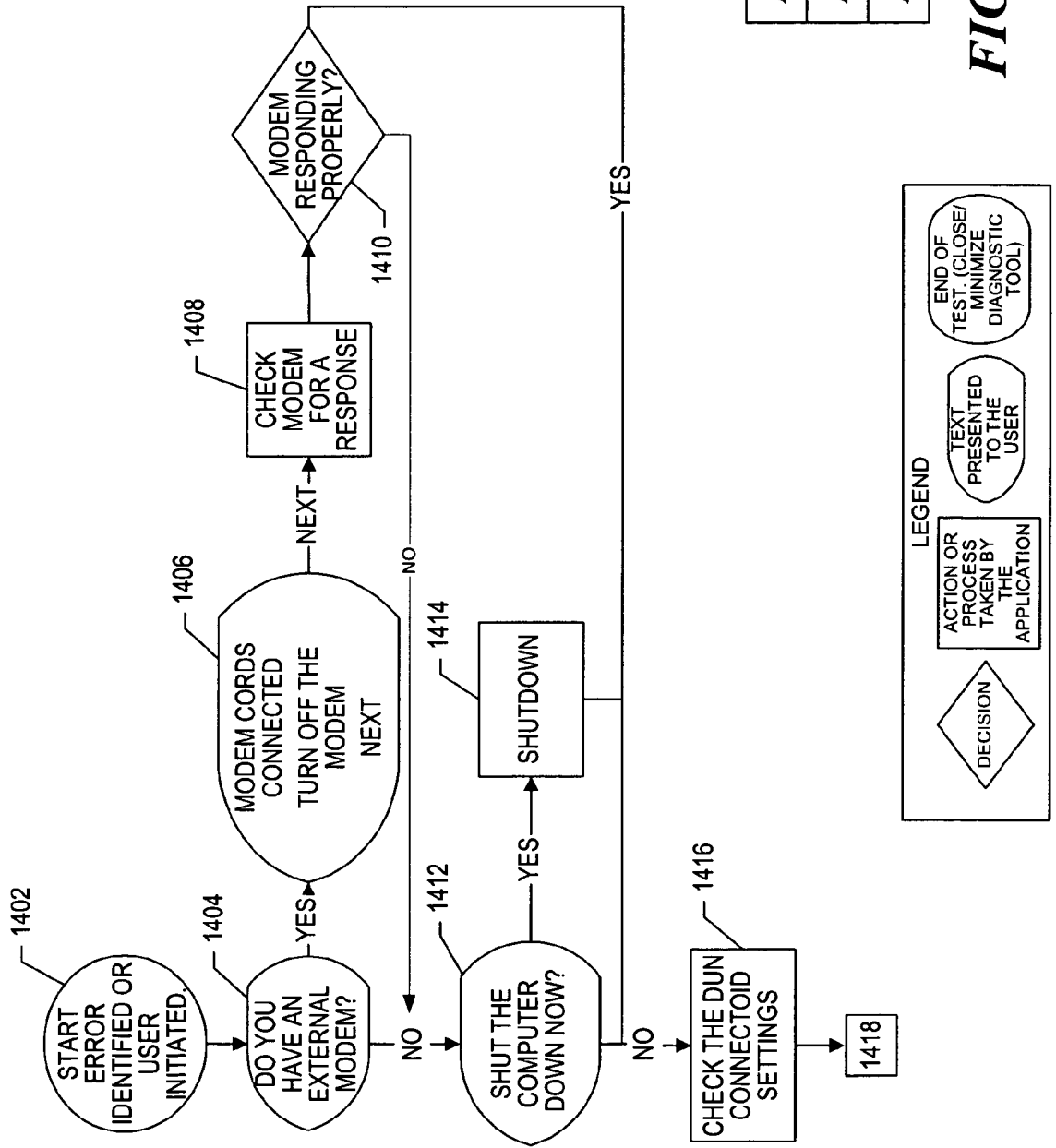
Figure 14B:
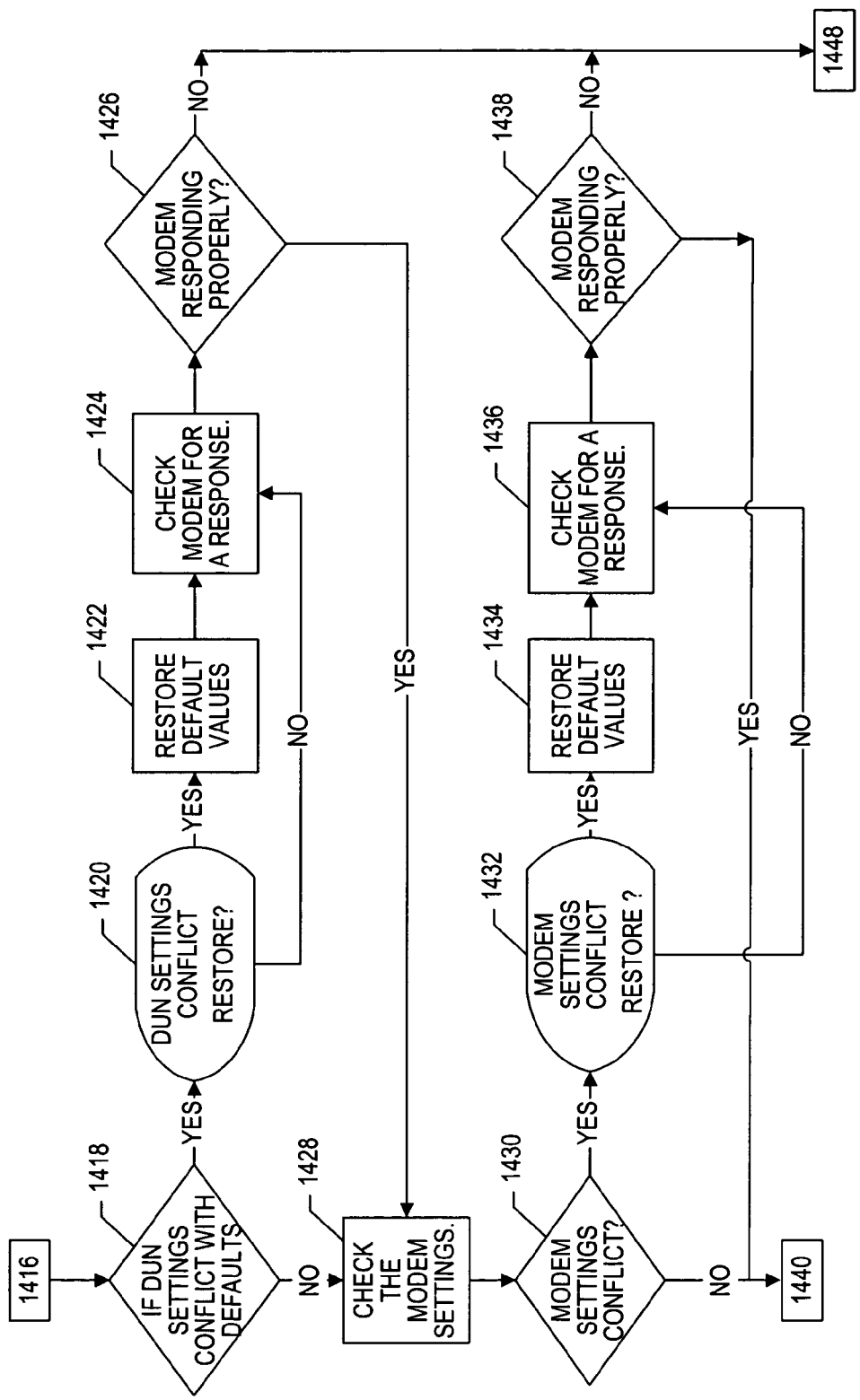
Figure 14C:
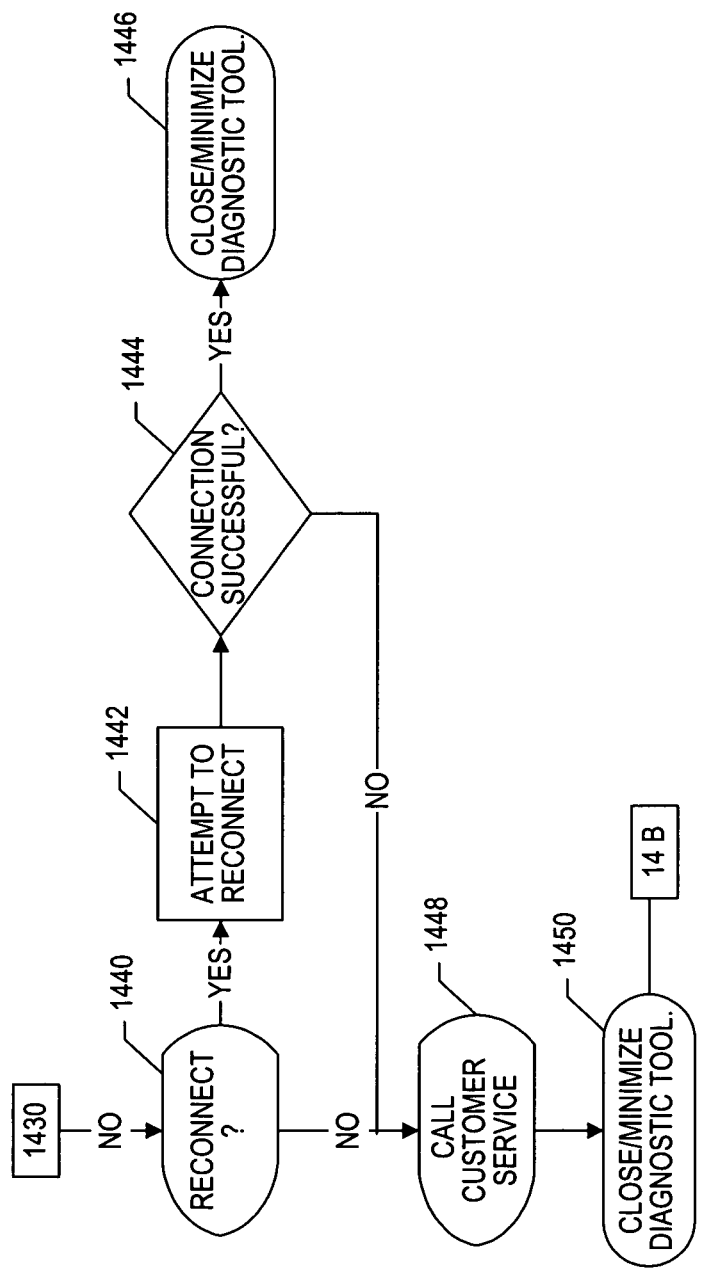

FIGS. 14A, 14B, and 14C depict a further exemplary error flow for a port disconnected by hardware failure error. As shown in step 1402, the system may identify the port disconnect error. The system may ask the user if an external modem is being used, as shown in step 1404. If they have an external modem, the system may suggest checking the connections manually, as shown in step 1406. The system may then check the modem for response, as shown in step 1408. If the modem is responding properly, as shown in step 1410, the system may move to another step. If the modem is not external, the diagnostic component may recommend shutting down the computer and request permission to do so, as shown in step 1412. If permission is provided, the system may shut down the computer, as shown in step 1414.

The system may check the dial-up network (DUN) connectoid settings, as shown in step 1416. The system may then determine if the DUN settings conflict with defaults, as shown in step 1418. If the settings conflict, the diagnostic system may request permission to restore the settings, as shown at step 1420. If permission is provided, the system may attempt to restore the default values into the DUN settings, as shown at step 1422 and then check for modem response. If the modem is responding properly, the system may then check the modem settings, as shown in step 1428. If the modem is not responding properly, the system may suggest calling customer service, as shown in step 1448.

The system may also check the modem settings, as shown in step 1428. Upon checking the modem settings, the system may determine whether the modem settings conflict with defaults, as shown in step 1430. If the settings conflict with defaults, the system may request permission to restore the default settings. If permission is provided, the system may attempt to restore the default values, as shown in step 1434, and then check for a modem response, as shown in step 1436. If the modem is not responding, as determined in step 1438, the system may suggest calling customer service, as shown in step 1448.

Once the modem settings have been checked, the system may suggest reconnecting, as shown in step 1440. If permission is granted, the system may attempt to reconnect, as shown in step 1442. The system may then test to determine if the connection is successful, as shown in step 1444. If the connection is successful, the diagnostics tool may be minimized or closed, as shown in step 1446. If the connection is unsuccessful, the system may suggest calling customer service, as shown in step 1448 and then close or minimize the diagnostic tool, as shown in step 1450.

Figure 15B:
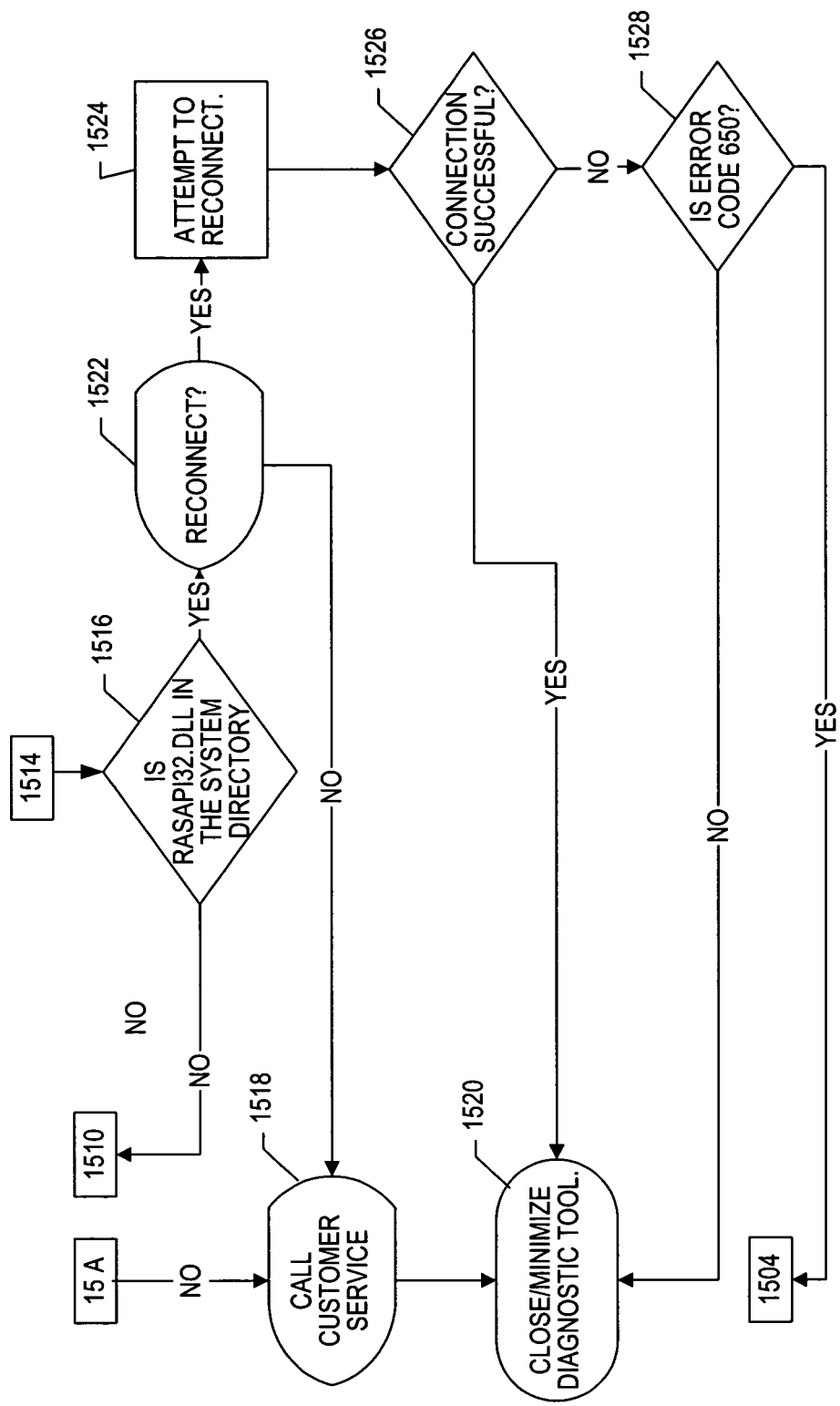

FIGS. 15A, and 15B depict a further exemplary diagnostics flow for a remote access server not responding error. The error may be detected, as shown at step 1502. The system attempts to determine whether a specific dynamic link library (DLL) is located in the system directory, as shown in step 1504. If the DLL is within the directory, the system may suggest shutting down the computer and request permission, as shown in step 1506. If permission is granted, the system may restart the computer, as shown in step 1508. If permission is not granted, the system may suggest calling customer service, as shown in step 1518.

If the DLL is not in the system directory, the diagnostic GUI may suggest reinstalling the connection manager, as shown in step 1510. If permission is provided, the system may request preparing for installation by, for example, inserting the CD. If the CD is inserted, the system may save the state and exit the connection manager. If, in step 1512, the connection manager or installation is cancelled, the system may suggest calling customer service, as shown in step 15 18. Upon reboot of the system or installation of the connection manager, the system may test for the DLL again, as shown in step 1516. If the DLL is not there, the system may again suggest reinstalling. If the DLL is there, the system will request permission to reconnect, as shown in step 1522.

If permission is not provided, the system will suggest that the customer call customer service, as shown in step 1518. If permission is provided, the system may attempt to reconnect, as shown in step 1524, test the connection, as shown in step 1526, and if the connection is successful, close and minimize the diagnostic tool, as shown in step 1528. If the connection is not successful, the system may test to see whether the error code is the same, as shown in step 1528, and return to step 1504 if it is. If the error code is not the same, the system may close and minimize the diagnostics tool.

Figure 16B:
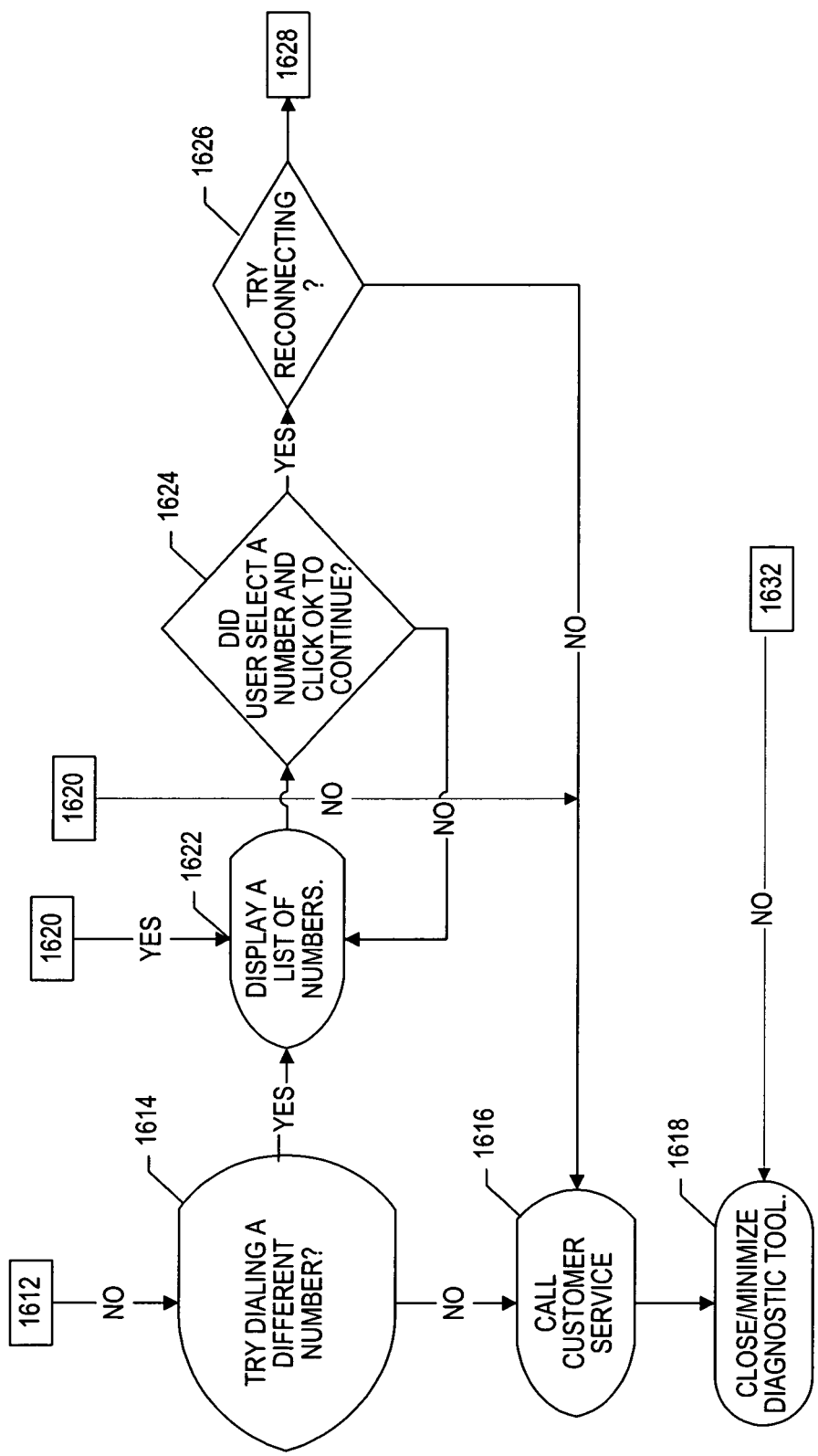
Figure 16C:
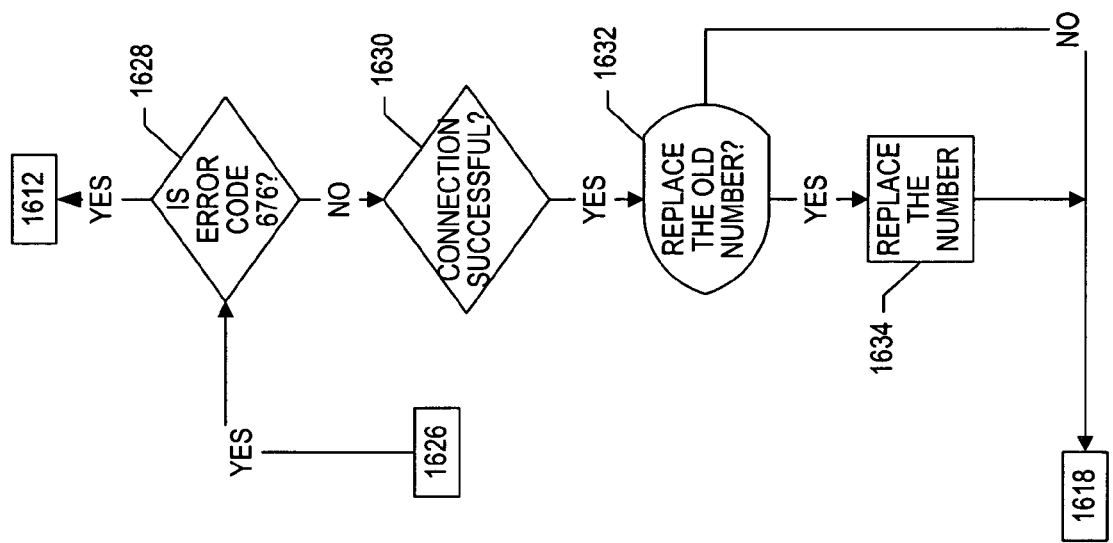

FIGS. 16A, 16B, and 16C depict another exemplary embodiment of a diagnostic flow for a line busy error. The system may identify the error, as shown in step 1602. The system may determine whether the user dialed a custom number, as show in step 1604. If the customer dialed a custom number, the diagnostic GUI might suggest and ask permission to download a list of preset numbers, as shown at step 1606. If permission is given, the system may download an updated list, as shown at step 1610. If permission is not provided, the GUI may display an error message indicating that the number was busy and suggest dialing a different number, as shown at step 1620.

If the user did not dial a custom number, the system may test to determine whether the phone list has been updated, as shown in step 1608. If the phone list has not been updated, the system may download and update the phone list, as shown in step 1610. The system may then determine whether the dialed number is in the supported number list as shown in step 1612. If the dialed number is in the supported list, the system may indicate that the number is busy and suggest dialing a new number, as shown in step 1620. If the dialed number is not in the list, the system may inform the user that the dialed number is not in the list and suggest dialing a different number, as shown in step 1614. If the user does not desire dialing a different number, the system may suggest calling customer service, as shown in step 1616. If the user does provide permission to dial a different number, a list of different numbers may be provided, as shown in step 1622. As shown in step 1624, the system may test to determine whether the user selected a new number. If the user selected a new number, the system may request permission to reconnect, as shown in step 1626. If permission is not provided, the user may be prompted to call customer service, as show in step 1616. If permission is granted, the system may test for further errors, as shown in step 1626. If these errors occur, the system may suggest dialing a different number. If errors did not occur, the system may test to see if the connection was successful, as shown in step 1630. If the connection was successful, the system may request permission to replace old numbers with the new numbers, as shown in step 1632. If permission is granted, the system may replace the numbers, as shown in step 1634, and subsequently close and minimize the diagnostic tool, as shown in step 1618.

Figure 17A:
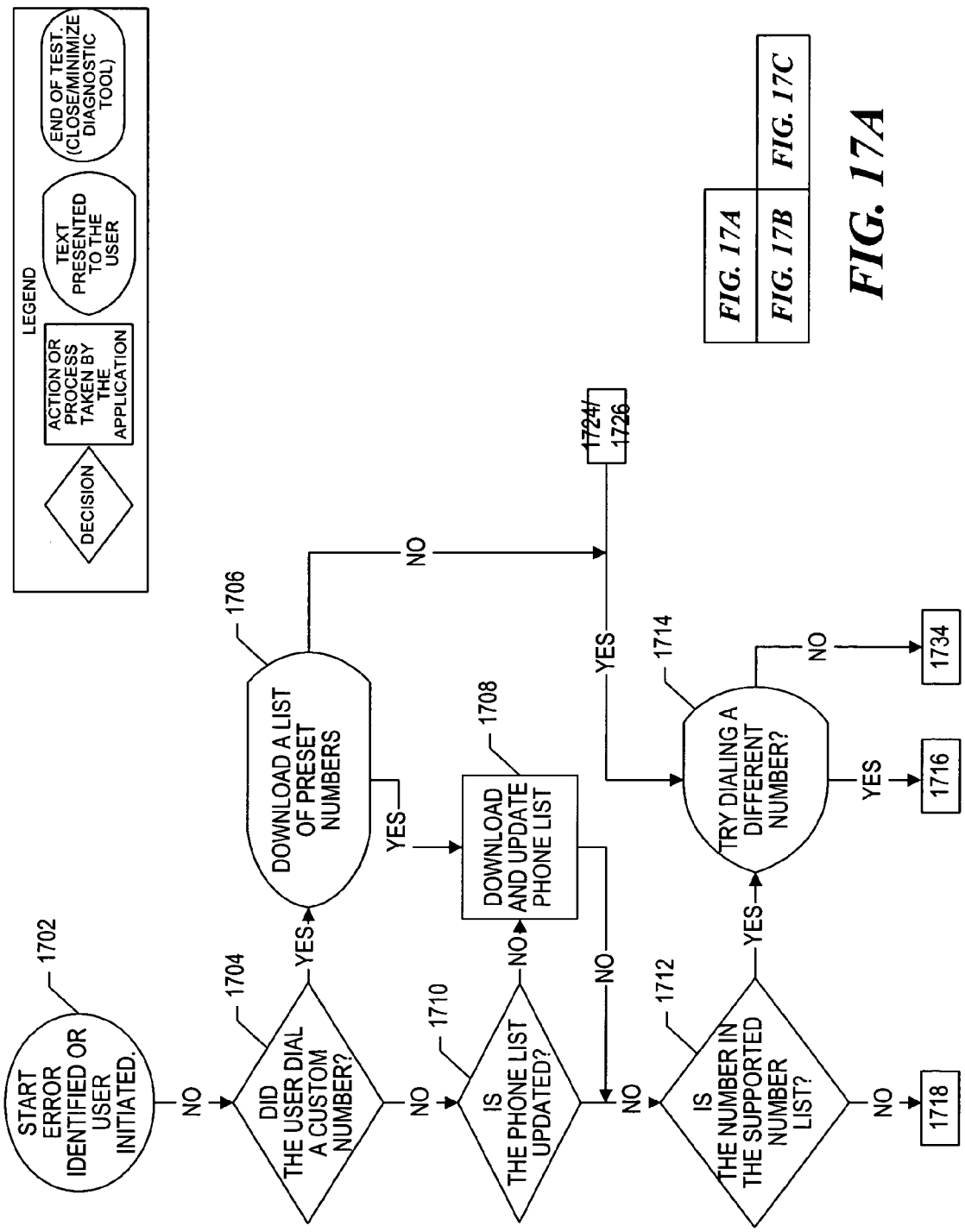
Figure 17B:
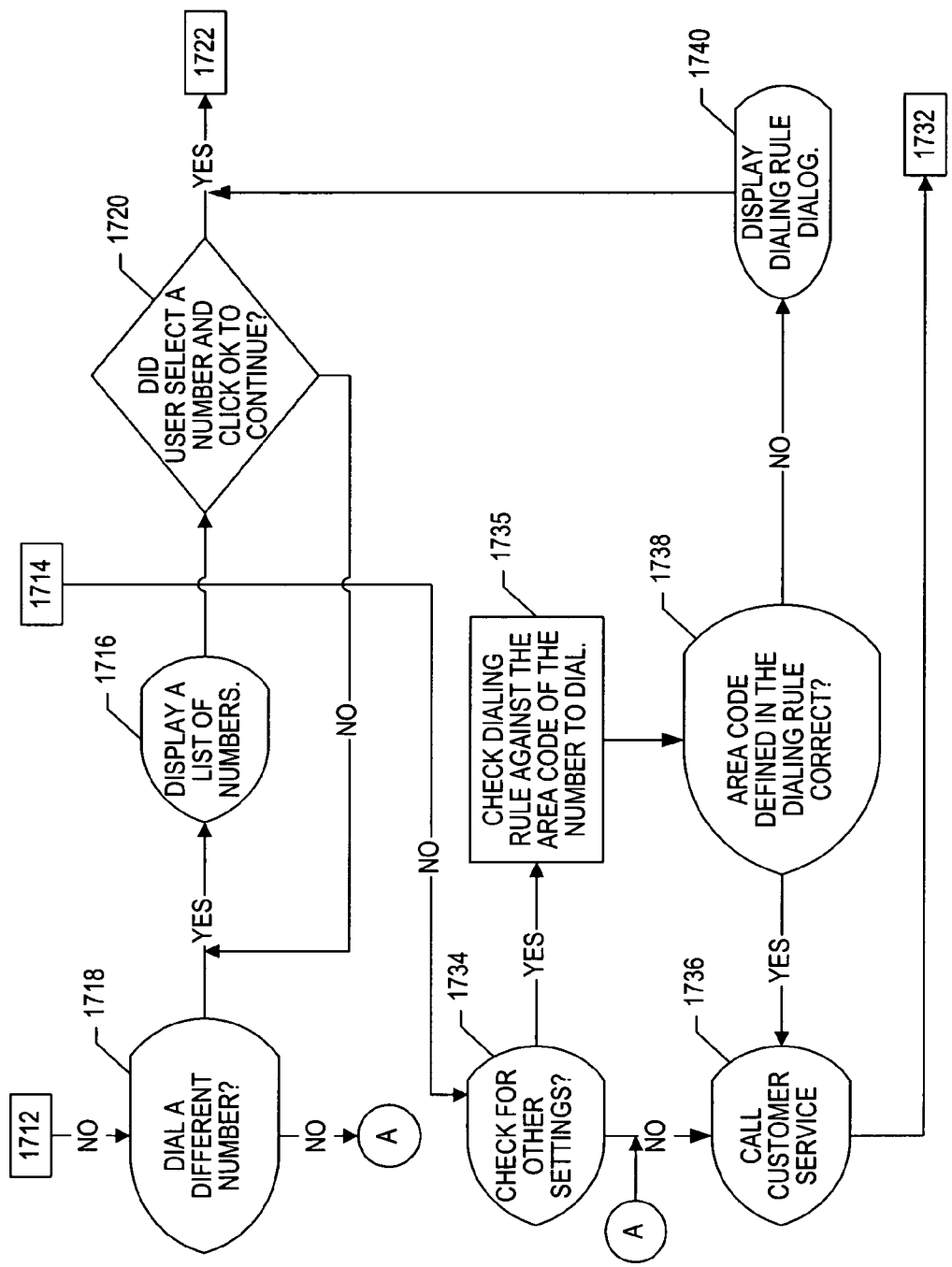
Figure 17C:
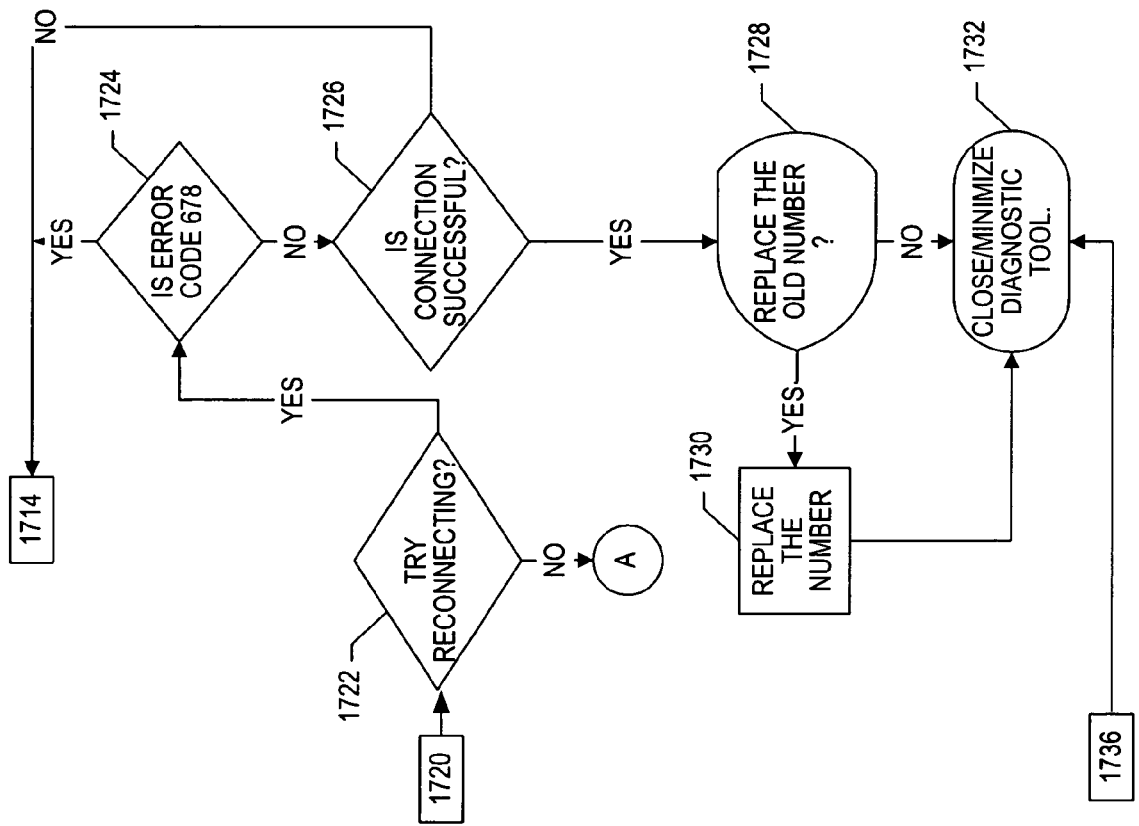

FIGS. 17A, 17B, and 17C depict an error flow for a no answer error. At step 1702, the system may determine that there was no answer. The system may then determine whether a custom number had been dialed, as shown in step 1704. If a custom number was dialed, the system suggests downloading a set of updated phone numbers, as shown in step 1706. If permission is not granted, the system suggests dialing a different phone number, shown in step 1714. If permission is granted, the system downloads and updates the phone list, as shown in step 1708.

If the user did not dial a custom number, the system may test to determine whether the phone list has been updated, as shown at step 1710. If the phone list has not been updated, the system may download and update a phone list, as shown in step 1708. The system may then test to determine whether the dialed number is in the supported phone number list, as shown in step 1712. If the dialed number is in the supported list, the system may suggest that there is no answer, and suggest dialing a different number, as shown in step 1714. If the number is not in the supported list, the user may be notified and asked to select a different number, as shown in step 1718. If the user does not select a different number, the system may suggest calling customer service, as seen in step 1736.

If, in the case of steps 1718 and 1714, the user provides permission to try a different number, a set of new numbers may be displayed, as shown in step 1716. Once a new number has been selected, as shown in step 1720, the system may request permission to reconnect, as shown in step 1722. If permission is not granted, the system may suggest calling customer service, as shown in step 1736. If permission is granted, the system may test for an error code, as shown at step 1724. If there is an error code that occurs, as shown at step 1724, the system may suggest trying a different number, as shown in step 1714. If there is no error code, the system may determine whether the connection was successful, as shown in step 1726. If the connection is not successful, the system may suggest dialing a different number, as shown in step 1714. If the connection is successful, the system may request permission to save the successful number, as shown in step 1728. If permission is provided, the system may save the successful number as shown in step 1730, and then close and minimize the diagnostics tool.

If at step 1714, the user does not provide permission to dial a different number, the system may request permission to test other rules, networks, and settings, as shown instep 1734. If permission is granted, the system may check the dialing rules against the area code number, as shown in step 1735. An error message may be presented to the user, as seen in step 1738. If the area code fits the dialing rule, the system may suggest calling customer service, as shown in step 1736. If the area code does not fit the dialing rule, the system may display dialing rule dialogs, as shown in step 1740 and attempt to reconnect.

Figure 18B:
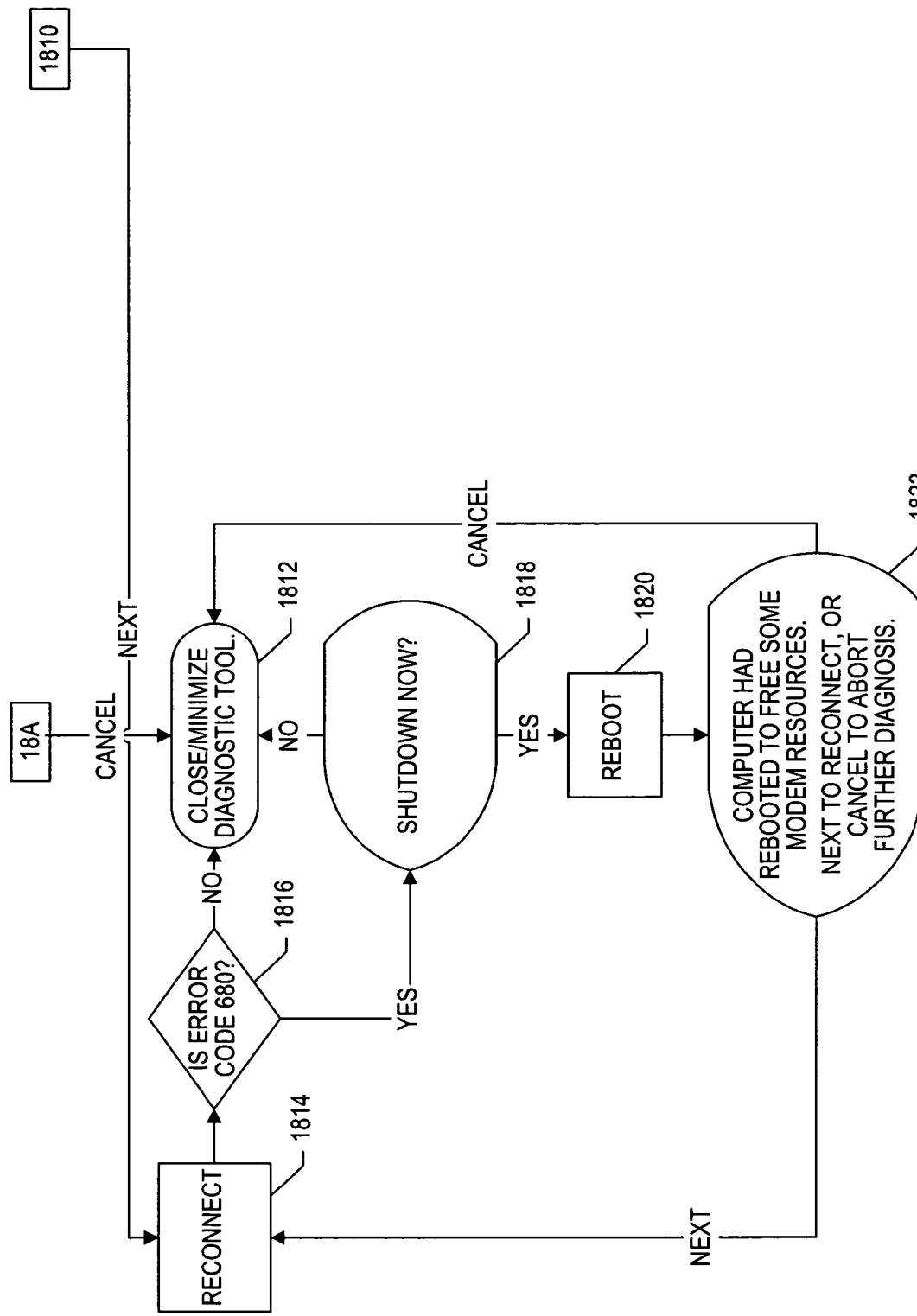

FIGS 18A and 18B depict an exemplary diagnostics flow for a dial tone error. As seen in step 1802, a dial tone error may be identified. The system may request that the user check that the telephone line is connected to the modem, as shown in step 1804. The system may the suggest checking the phone line to make sure that no one is using the phone line, as shown in step 1806. The system may suggest picking up the phone to determine if a dial tone is heard, as shown in step 1808. If a dial tone is not heard, the system may suggest again connecting the phone line to the phone. If a dial tone is heard, the system may suggest hanging up the phone and attempting to connect again, as shown in step 1810. The system may then reconnect, as shown in step 1814. If the same error occurs, as shown in step 1816, the system may recommend shutting down the computer, as shown in step 1818. If permission to shut down the computer is provided, the system may shut down, as shown in step 1820, and, upon reboot, request permission to attempt to reconnect, as shown instep 1822. If permission to shut down is not provided, the system may close and minimize the diagnostics tool, as shown in step 1812.

Figure 19B:
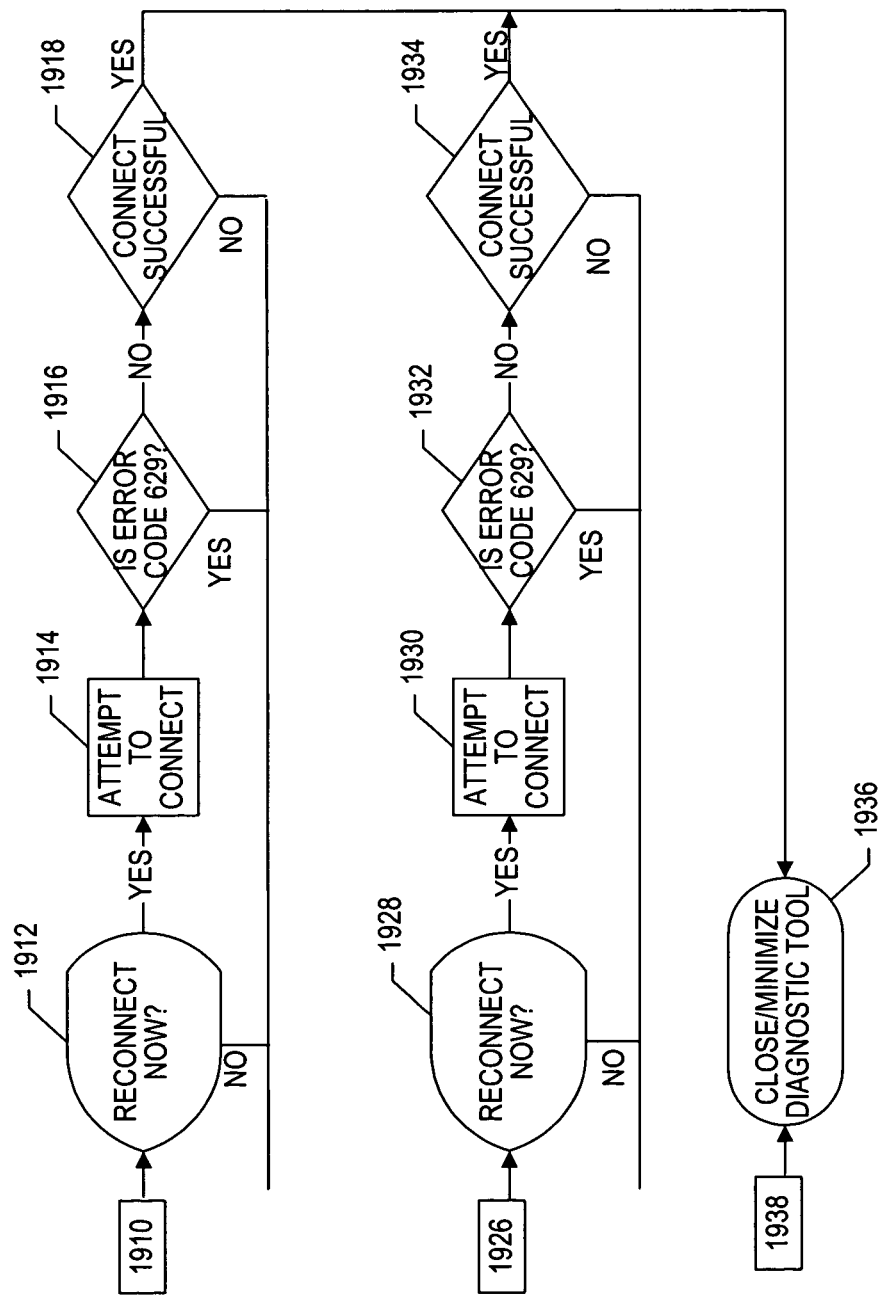

FIGS. 19A and 19B depicts a port disconnected by a remote error diagnostic flow. If the port disconnect error is detected, as shown in step 1902, the system may validate dialer modem settings, as shown in step 1904. If discrepancies are found, as shown in step 1906, the system may notify the user and request permission to change them, as shown in step 1908. If permission is provided, the system may restore the modem settings defaults or last successful settings, as shown in step 1910. The system may then notify the user that the defaults have been restored, as show in step 1912, and suggest reconnecting. If reconnecting is permitted, the system may attempt to reconnect, as shown in step 1914. The system may test for the same error code, as show in step 1916. If no error code is found, the system may test to determine whether the connection was successful, as shown in step 1918. If the connection was successful, the system may close and minimize the diagnostic tools, as shown in step 1936.

However, if permission to reset settings is not provided at step 1908, permission to reconnect is not provided, as shown in step 1912, the error code occurs, as shown in step 1916, or the connection was not successful, as shown at step 1918, the system may attempt to validate the DUN settings as shown in step 1920. The system then tests to determine whether discrepancies were found, as shown in step 1922. If discrepancies are found, the system may request permission to fix them, as shown in step 1924. If permission is granted, the system may restore the DUN settings, as shown at step 1926. The system may then notify the user that the settings have been changed and request permission to reconnect, as shown at step 1928. If permission is granted, the system may attempt to connect, as shown in step 1930. The system may also test to determine whether the same error code has been found, as shown in step 1932. If the same error code is not found, the system may test the connection to determine whether it was successful, as show in step 1934. If the connection was successful, the system may close or minimize the diagnostic tool, as shown at step 1936.

However, if permission to fix the DUN settings is not provided, permission to reconnect is not provided, the error code is found, or the connection is not successful, the system may suggest calling customer service, as shown at step 1938, and then close or minimize the diagnostic tool, as shown at step 1936.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable storage device comprising instructions, that when executed by a processor, cause the processor to perform operations comprising:
    displaying a graphical user interface, the graphical user interface including a form component, wherein the form component includes a text entry component;

displaying an advice window with the graphical user interface in response to a user entry of text into the text entry component, wherein the advice window is selectively displayed after the user entry of text fails to match one of a plurality of domain name extensions;

in response to the user entry of text being similar to one of the plurality of domain name extensions, automatically changing the user entry of text to the one of the plurality of domain name extensions;

accessing a dialer configured to interact with a modem to provide a connection to a service provider;

displaying an applications interface configured to:
  indicate to an external computer program whether a first window is visible, whether the connection is active, a list of users, or any combination thereof; and
  in response to a request from the external program, set an active user, exit, show a second window, hide a third window, receive a subscription to events, receive an unsubscription to the events, dial a toll free number, disconnect without a prompt, sign in a user, display a sign in dialog, display an edit connection screen, update and refresh a connection pane, or any combination thereof; and determining, at an update manager, after a time period, whether updated software is available and, when updated software is available, downloading and applying the updated software.

2. The computer-readable storage device of claim 1, wherein the form component further comprises a button, wherein the advice window is configured for display when the form component is available for manipulation by the user and before the button is selected by the user.

3. The computer-readable storage device of claim 1, wherein the advice window minimizes upon expiration of a time period.

4. The computer-readable storage device of claim 1, wherein the advice window minimizes to an icon.

5. The computer-readable storage device of claim 1, further comprising:
  a list of phone numbers retrievable from a memory device and associated with the service provider, each phone number in the list of phone numbers having an associated priority number.

6. The computer-readable storage device of claim 5, wherein the phone numbers in the list of phone numbers are sorted in accordance with the priority number and wherein the phone numbers, as sorted, are sequentially used in attempts to connect to the service provider.

7. The computer-readable storage device of claim 5, further comprising:
  an update tool configured to interact with the service provider to manipulate the list of phone numbers.

8. The computer-readable storage device of claim 7, wherein phone numbers in the list of phone numbers are edited.

9. The computer-readable storage device of claim 7, wherein priority numbers associated with the list of phone numbers are edited using the update tool.

10. A method of connection management, the method comprising:
  displaying a graphical user interface, the graphical user interface including a form component, wherein the form component includes a text entry component;
  displaying an advice window in response to a user entry of text into the text entry component, wherein the advice window is selectively displayed after the user entry of text fails to match one of a plurality of domain name extensions;
  in response to the user entry of text being similar to one of the plurality of domain name extensions, automatically changing the user entry of text to the one of the plurality of domain name extensions;
  accessing a dialer, the dialer configured to direct a modem to connect to a service provider;
  displaying an applications interface configured to:
    indicate to an external computer program whether a first window is visible, whether a connection to the service provider is active, a list of users, or any combination thereof; and
    in response to a request from the external program, set an active user, exit, show a second window, hide a third window, receive a subscription to events, receive an unsubscription to the events, dial a toll free number, disconnect without a prompt, sign in a user, display a sign in dialog, display an edit connection screen, update and refresh a connection pane, or any combination thereof; and
  initiating, after the connection to the service provider is established, an update manager to check, after a time period, for updated software.

11. The method of claim 10, wherein the form component further comprises a selectable button, wherein the advice window is displayed when the form component is available for manipulation by the user and before the button is selected by the user.

12. The method of claim 10, further comprising minimizing the advice window upon expiration of a second time period.

13. The method of claim 12, wherein the advice window minimizes to an icon.

14. The method of claim 10, further comprising sorting a list of phone numbers to produce a priority sorted list, each phone number in the list of phone numbers associated with an associated priority number, wherein the sorting is conducted in accordance with the priority number of each phone number.

15. The method of claim 14, further comprising directing the dialer to dial a phone number from the priority sorted list.

16. The method of claim 14, further comprising:
  activating an update tool configured to communicate with the service provider to manipulate the list of phone numbers.

17. The method of claim 10, wherein displaying the advice window comprises displaying a statement encouraging correction of the user entry of text.

18. The method of claim 10, wherein displaying the advice window comprises displaying a suggested alternative to the user entry of text.

19. The method of claim 10, wherein displaying the advice window comprises displaying an offer to change the user entry of text.

20. The method of claim 10, wherein displaying the advice window comprises displaying a list, wherein the list includes a plurality of alternatives.

21. A connection manager device comprising:
  a processor; and
  a memory comprising instructions that, when executed by the processor, cause the processor to perform operations comprising:
    displaying a graphical user interface, the graphical user interface including a form component, wherein the form component includes a text entry component;

displaying an advice window in response to a user entry of text into the text entry component, wherein the advice window is selectively displayed after the user entry of text fails to match one of a plurality of domain name extensions;

in response to the user entry of text being similar to one of the plurality of domain name extensions, automatically changing the user entry of text to the one of the plurality of domain name extensions;

directing a dialer to connect via a modem to a service provider;

displaying an applications interface configured to:
    indicate to an external computer program whether a first window is visible, whether a connection to the service provider is active, a list of users, or any combination thereof; and
    in response to a request from the external program, set an active user, exit, show a second window, hide a third window, receive a subscription to events, receive an unsubscription to the events, dial a toll free number, disconnect without a prompt, sign in a user, display a sign in dialog, display an edit connection screen, update and refresh a connection pane, or any combination thereof; and initiating, after the connection to the service provider is established, an update manager to check, after a time period, for updated software.

22. The connection manager device of claim 21, wherein the form component further comprises a selectable button, wherein the advice window is displayed when the form component is available for manipulation by the user and before the button is selected by the user.

23. The connection manager device of claim 21, wherein the operations further comprise minimizing the advice window upon expiration of a second time period.

24. The connection manager device of claim 21, wherein the dialer includes a priority sorted list of phone numbers, each phone number in the list of phone numbers associated with an associated priority number.

25. The connection manager device of claim 24, wherein directing the dialer to connect via the modem includes directing the dialer to dial one of the phone numbers from the priority sorted list of phone numbers.

26. The connection manager device of claim 24, wherein the operations further comprise activating an update tool configured to communicate with the service provider to manipulate the list of phone numbers.

27. The connection manager device of claim 21, wherein the operations further comprise identifying, when the connection to the service provider is not established, an error associated with the dialer, wherein the error is an authentication failure, a modem port availability failure, a port disconnection failure, a server response error, a line busy error, a no answer error, a dial tone failure, or any combination thereof.

* * * * *